(12) United States Patent
Mishra et al.

(10) Patent No.: US 12,079,233 B1
(45) Date of Patent: Sep. 3, 2024

(54) MULTIPLE SEASONALITY ONLINE DATA DECOMPOSITION

(71) Applicant: SPLUNK INC., San Francisco, CA (US)

(72) Inventors: Abhinav Mishra, San Francisco, CA (US); Ram Sriharsha, San Francisco, CA (US); Sichen Zhong, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 593 days.

(21) Appl. No.: 17/246,241

(22) Filed: Apr. 30, 2021

Related U.S. Application Data

(63) Continuation-in-part of application No. 17/069,693, filed on Oct. 13, 2020, now Pat. No. 11,729,074.

(60) Provisional application No. 63/064,344, filed on Aug. 11, 2020.

(51) Int. Cl.
*G06F 16/2458* (2019.01)

(52) U.S. Cl.
CPC .................. *G06F 16/2465* (2019.01)

(58) Field of Classification Search
CPC .................................................. G06F 16/2465
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2005/0256759 A1 | 11/2005 | Acharya et al. | |
| 2019/0035123 A1 | 1/2019 | Garvey et al. | |
| 2019/0098106 A1 | 3/2019 | Mungel et al. | |
| 2019/0102276 A1 | 4/2019 | Dang et al. | |
| 2022/0343168 A1 | 10/2022 | Suthar et al. | |

OTHER PUBLICATIONS

Gao, J., et al., "Robusttad: Robust Time Series Anomaly Detection Via Decomposition And Convolutional Neural Networks", arxiv. org, Cornell University Library, pp. 1-9 (Feb. 21, 2020).

(Continued)

*Primary Examiner* — Brian Whipple
(74) *Attorney, Agent, or Firm* — Shook, Hardy & Bacon L.L.P.

(57) ABSTRACT

Embodiments described herein are directed to facilitating performing online data decomposition to identify multiple seasonal components. In accordance with aspects of the present disclosure, a first iterative process is performed to determine a first seasonal component associated with an incoming data point based on a set of previous data points of a time series data set and corresponding data components. In addition, a second iterative process is performed to determine a second seasonal component associated with the incoming data point based on previous data points of the time series data set and corresponding data components. The first seasonal component and the second seasonal component can then be provided for analysis of the incoming data point (e.g., for presentation, for use in determining trend and residual components, etc.).

20 Claims, 33 Drawing Sheets

(56) References Cited

OTHER PUBLICATIONS

International Search Report and Written Opinion received for PCT Patent Application No. PCT/US2021/041684, mailed on Oct. 5, 2021, 8 pages.
International Preliminary Report on Patentability received for PCT Application No. PCT/US2021/041684, mailed on Feb. 23, 2023, 8 pages.
Bitincka, L., et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, p. 9.
Carasso, David, "Exploring Splunk," published by CITO Research, New York, NY, Apr. 2012, p. 156.
Splunk Cloud 8.0.2004 User Manual, available online, retrieved May 20, 2020 from docs.splunk.com, p. 66.
Splunk Enterprise 8.0.0 Overview, available online, retrieved May 20, 2020 from docs.splunk.com, p. 17.
Splunk Quick Reference Guide, updated 2019, available online at https://www.splunk.com/pdfs/solution-guides/splunk-quick-reference-guide.pdf, retrieved May 20, 2020, p. 6.

FIG. 6A

| Data Summary | | | |
|---|---|---|---|
| Hosts (5) | Sources (8) | Sourcetypes (3) | |
| filter | | | |
| Host ◇ | | Count ◇ | Last Update ◇ |
| mailsv | ⁀ | 9,829 | 4/29/14 1:32:47.000 PM |
| vendor_sales | ⁀ | 30,244 | 4/29/14 1:32:46.000 PM |
| www1 | ⁀ | 24,221 | 4/29/14 1:32:44.000 PM |
| www2 | ⁀ | 22,595 | 4/29/14 1:32:47.000 PM |
| www3 | ⁀ | 22,975 | 4/29/14 1:32:45.000 PM |

New Pivot 1,776,004 of 1,776,004 events matched — 1500

Filters: All time

Split Rows: component

Split Columns: group

Column Values: Count of Event O...

| component ◇ | NULL ◇ | conf ◇ | deploy-connections ◇ | deploy-server ◇ | map ◇ | mpool ◇ | per_host_thruput ◇ | per_index_thruput ◇ | per_source_thruput ◇ | per_sourcetype_thruput ◇ | pipeline ◇ | queue ◇ | realtime_search_data ◇ |
|---|---|---|---|---|---|---|---|---|---|---|---|---|---|
| BucketMover | 4 | 0 | 0 | 0 | 0 | 0 | 0 | 0 | 0 | 0 | 0 | 0 | 0 |
| DatabaseDirectoryManager | 4 | 0 | 0 | 0 | 0 | 0 | 0 | 0 | 0 | 0 | 0 | 0 | 0 |
| DateParserVerbose | 562 | 0 | 0 | 0 | 0 | 0 | 0 | 0 | 0 | 0 | 0 | 0 | 0 |
| DiskMon | 3 | 0 | 0 | 0 | 0 | 0 | 0 | 0 | 0 | 0 | 0 | 0 | 0 |
| IndexConfig | 1 | 0 | 0 | 0 | 0 | 0 | 0 | 0 | 0 | 0 | 0 | 0 | 0 |
| LicenseUsage | 2872 | 0 | 0 | 0 | 0 | 0 | 0 | 0 | 0 | 0 | 0 | 0 | 0 |
| Metrics | 0 | 1 | 972 | 2916 | 972 | 972 | 4621 | 2843 | 9314 | 9306 | 18797 | 12636 | 972 |
| OneShotWriter | 12226 | 0 | 0 | 0 | 0 | 0 | 0 | 0 | 0 | 0 | 0 | 0 | 0 |
| TailingProcessor | 2 | 0 | 0 | 0 | 0 | 0 | 0 | 0 | 0 | 0 | 0 | 0 | 0 |
| WatchedFile | 18 | 0 | 0 | 0 | 0 | 0 | 0 | 0 | 0 | 0 | 0 | 0 | 0 |
| cached | 5 | 0 | 0 | 0 | 0 | 0 | 0 | 0 | 0 | 0 | 0 | 0 | 0 |
| decorators | 2 | 0 | 0 | 0 | 0 | 0 | 0 | 0 | 0 | 0 | 0 | 0 | 0 |
| utils | 1 | 0 | 0 | 0 | 0 | 0 | 0 | 0 | 0 | 0 | 0 | 0 | 0 |
| view | 6 | 0 | 0 | 0 | 0 | 0 | 0 | 0 | 0 | 0 | 0 | 0 | 0 |

20 per page ∨    Format ∨

MULTIPLE SEASONALITY ONLINE DATA DECOMPOSITION

CROSS-REFERENCE TO RELATED APPLICATION

This application is a Continuation-in-Part of U.S. patent application Ser. No. 17/069,693, filed Oct. 13, 2020 and titled "Online Data Decomposition," which itself claims the benefit of U.S. Provisional Patent Application No. 63/064,344, filed on Aug. 11, 2020, the entire contents of each of the foregoing applications being incorporated by reference herein.

BACKGROUND

Modern data centers often include thousands of hosts that operate collectively to service requests from even larger numbers of remote clients. During operation, components of these data centers can produce significant volumes of raw, machine-generated data. In many cases, such data, particularly time series data, is decomposed into data components that represent patterns associated with the data. For example, data may be decomposed into trend, seasonal, and residual components.

SUMMARY

Embodiments of the present technology are directed to facilitating performance of multiple seasonality online data decomposition. In this regard, in performing online data decomposition, multiple seasonal components associated with an incoming data point are determined (e.g., a weekly seasonality and a monthly seasonality). In accordance with aspects of the present disclosure, data decomposition is performed in an online manner such that data is decomposed as it received. Performing data decomposition in an online manner, as described herein, result in an accurate and efficient identification of data components, such as trend, seasonal(s), and residual. In performing online data decomposition, multiple seasonal components corresponding with data may be determined. In such a case, an iterative process is performed for each seasonality parameter to determine corresponding seasonal components for an incoming data point. Upon identifying each seasonal component, a final trend component and residual component may be identified based on each of the seasonal components being removed from the incoming data point.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

In the drawings:

FIG. 6A illustrates a search screen in accordance with the disclosed embodiments;

FIG. 6B illustrates a data summary dialog that enables a user to select various data sources in accordance with the disclosed embodiments;

FIGS. 7A-7D illustrate a series of user interface screens for an example data model-driven report generation interface in accordance with the disclosed embodiments;

FIG. 9B illustrates an incident review dashboard in accordance with the disclosed embodiments;

FIGS. 15-17 illustrate example visualizations generated by a reporting application in accordance with the disclosed embodiments;

DETAILED DESCRIPTION

Figure 1:
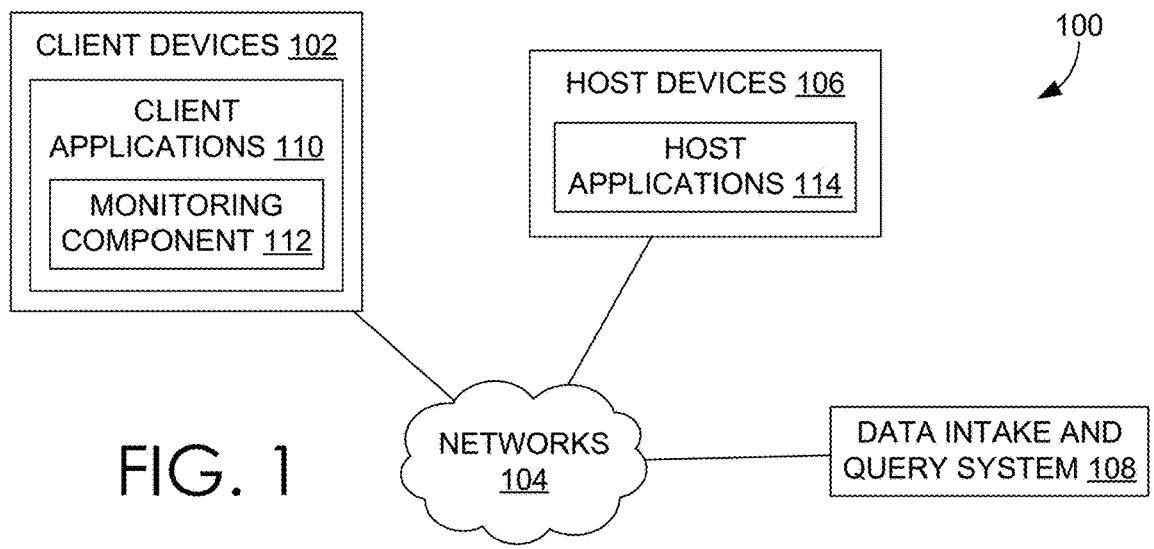
FIG. 1 illustrates a networked computer environment in which an embodiment may be implemented.

Embodiments are described herein according to the following outline:
1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7 Field Extraction
   2.8 Example Search Screen
   2.9. Data Modeling
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Data Center Monitoring
   2.13. Cloud-Based System Overview
   2.14. Searching Externally Archived Data
      2.14.1. ERP Process Features
3.0. Overview of Online Data Decomposition
   3.1. Overview of a Data Decomposition Engine
   3.2. Overview of a Data Decomposition Engine in a Data Processing Environment
   3.3. Illustrative Data Decomposition Operations
   3.4 Illustrative Operations for Determining Multiple Seasonal Components via Online Data Decomposition
   3.5 Illustrative Hardware System 1.0 General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
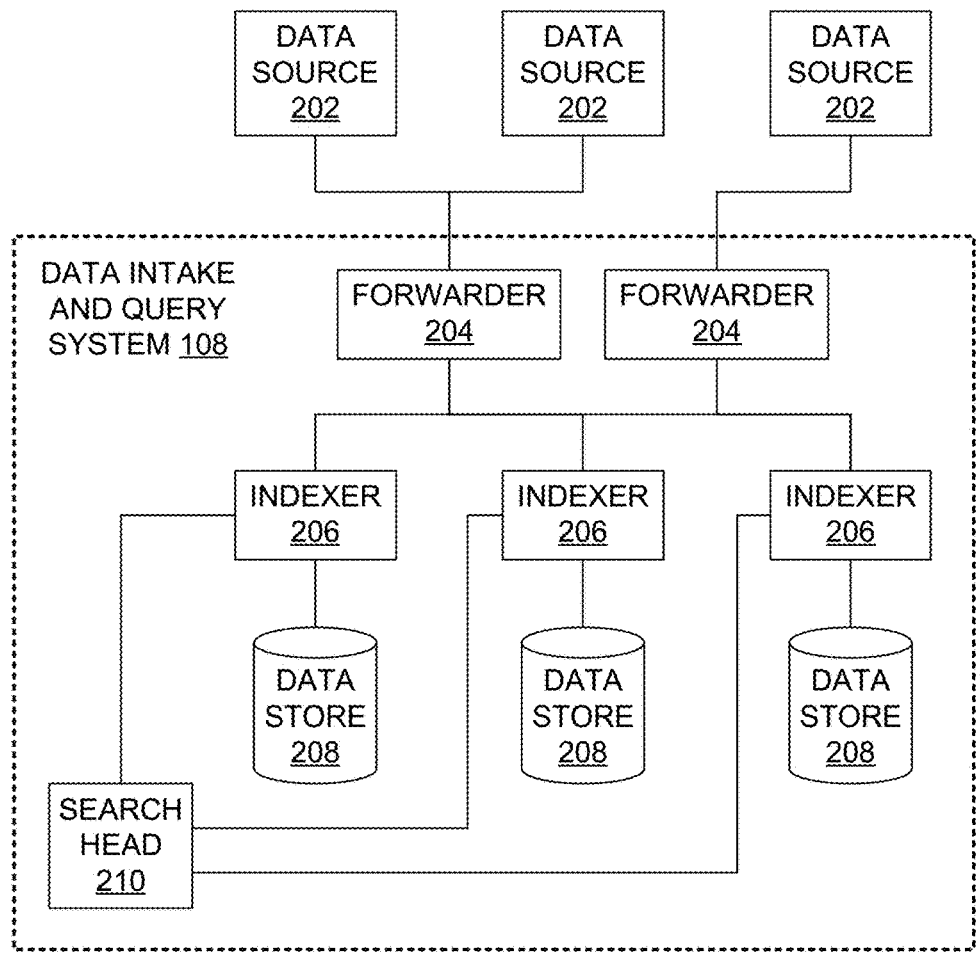
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
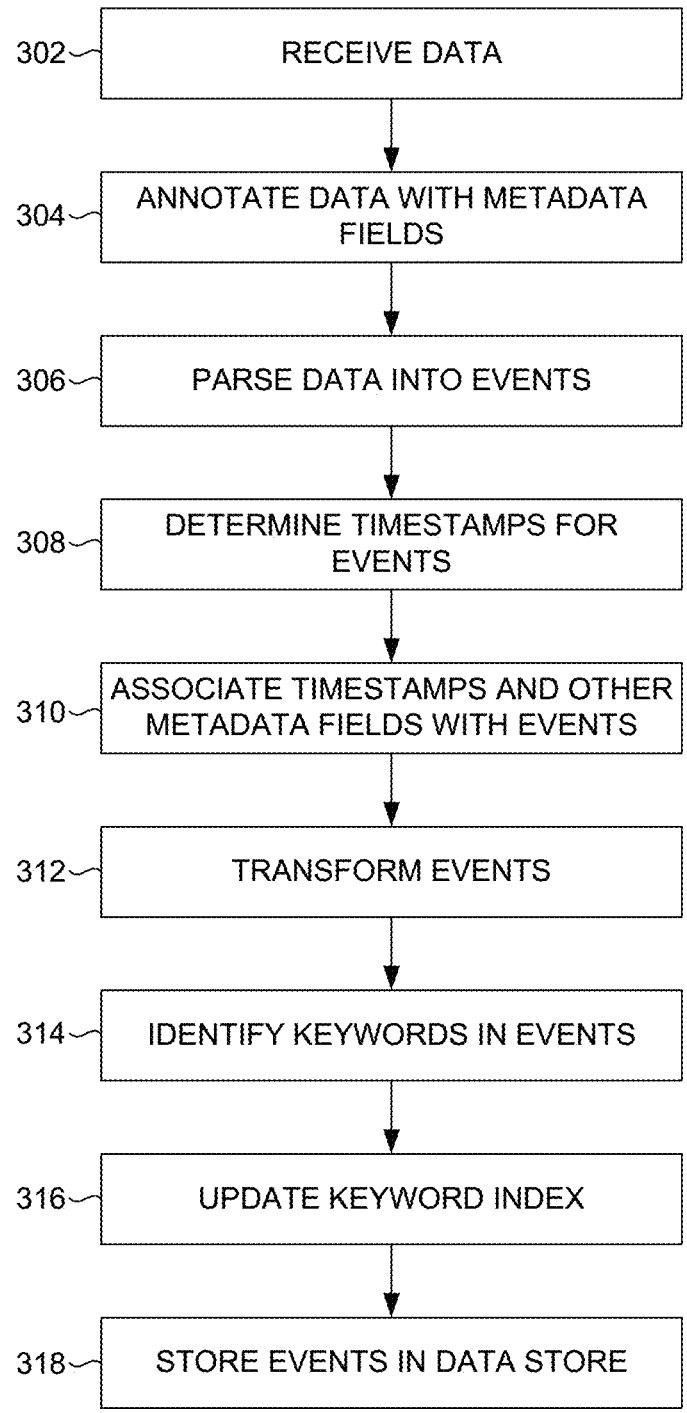
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
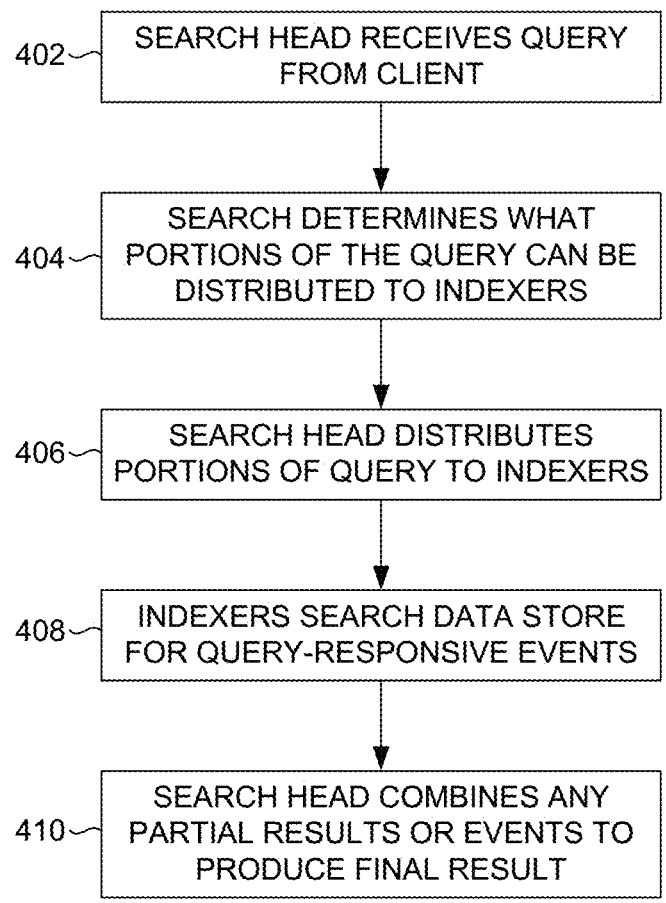
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
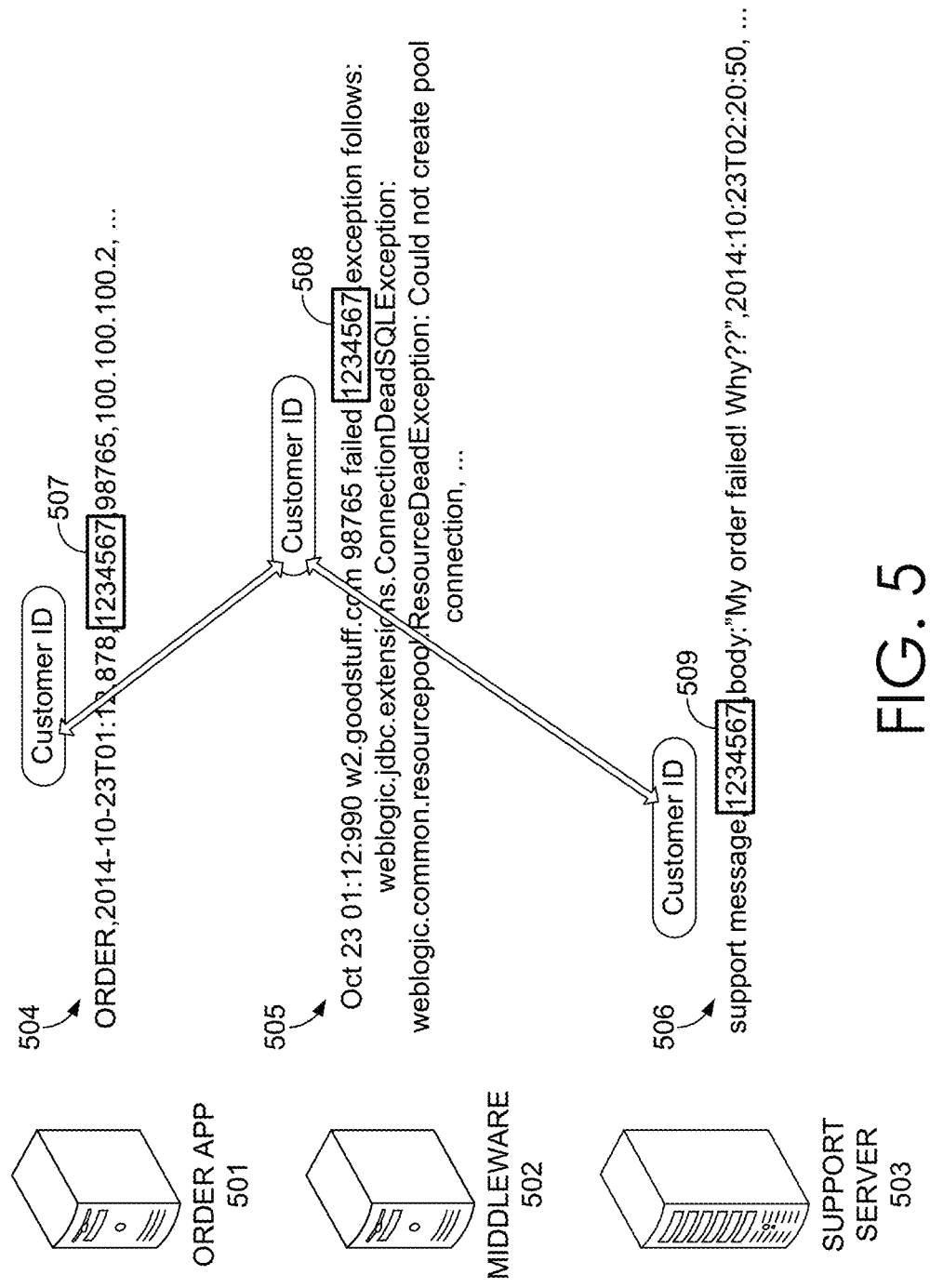
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
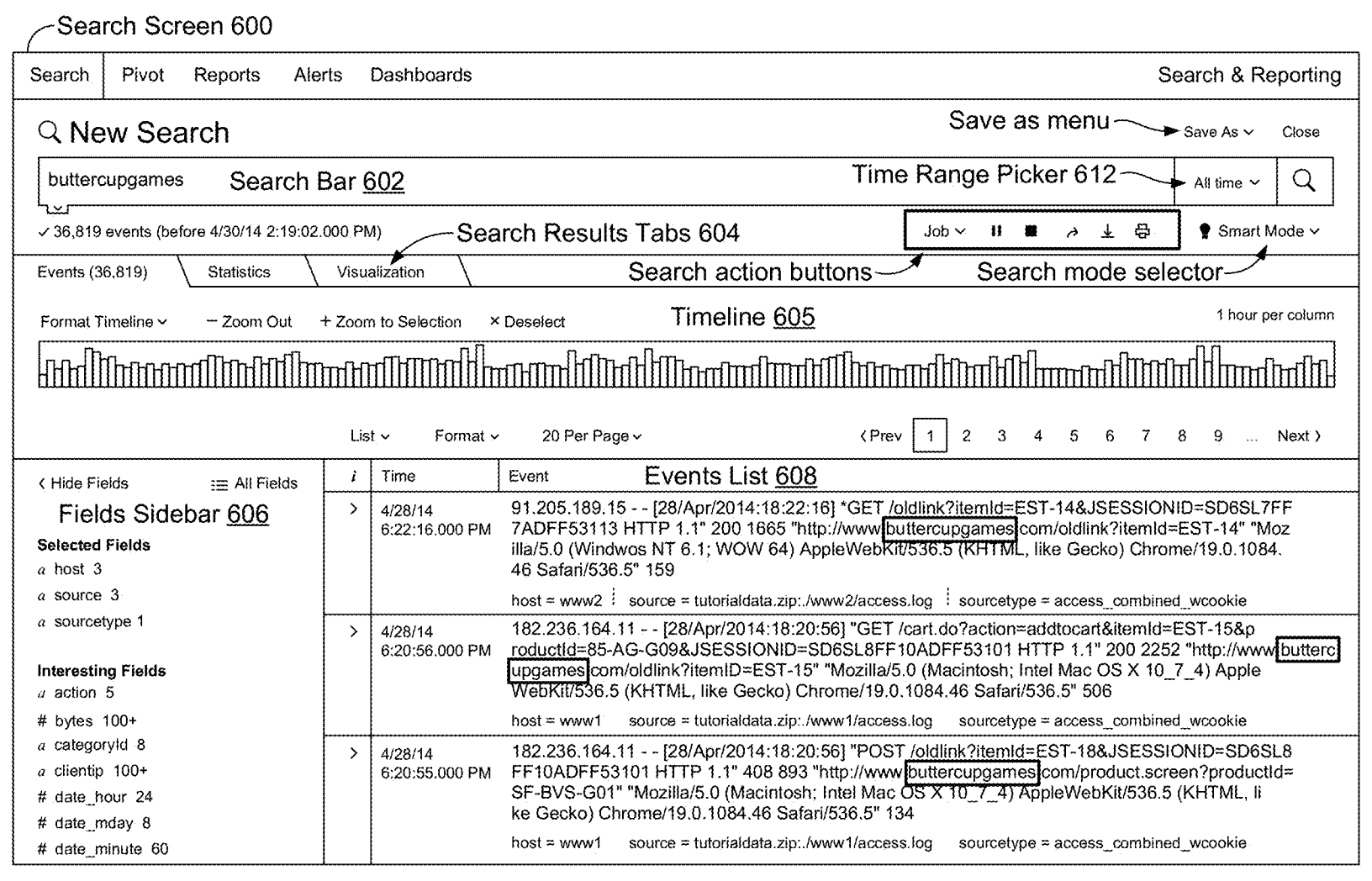

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
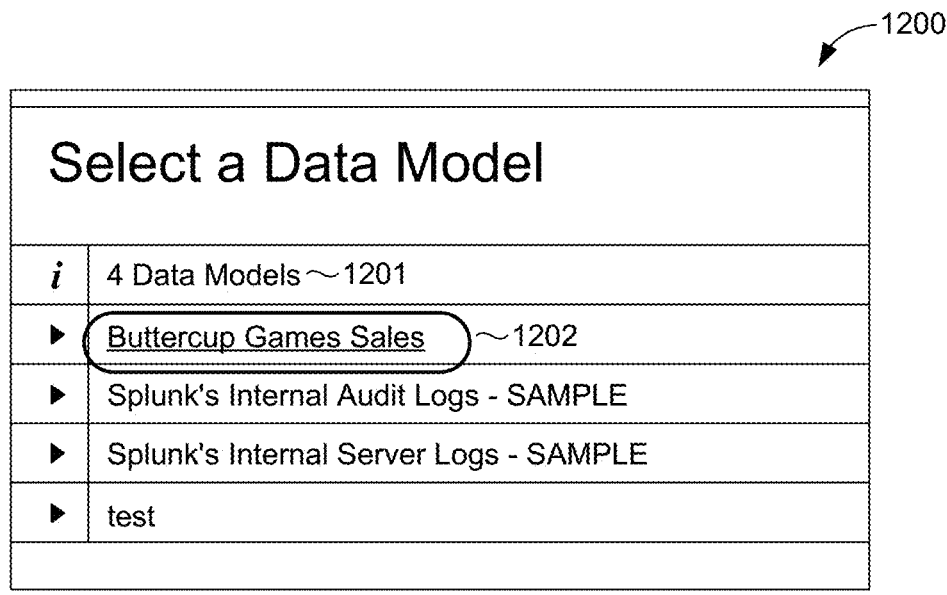
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
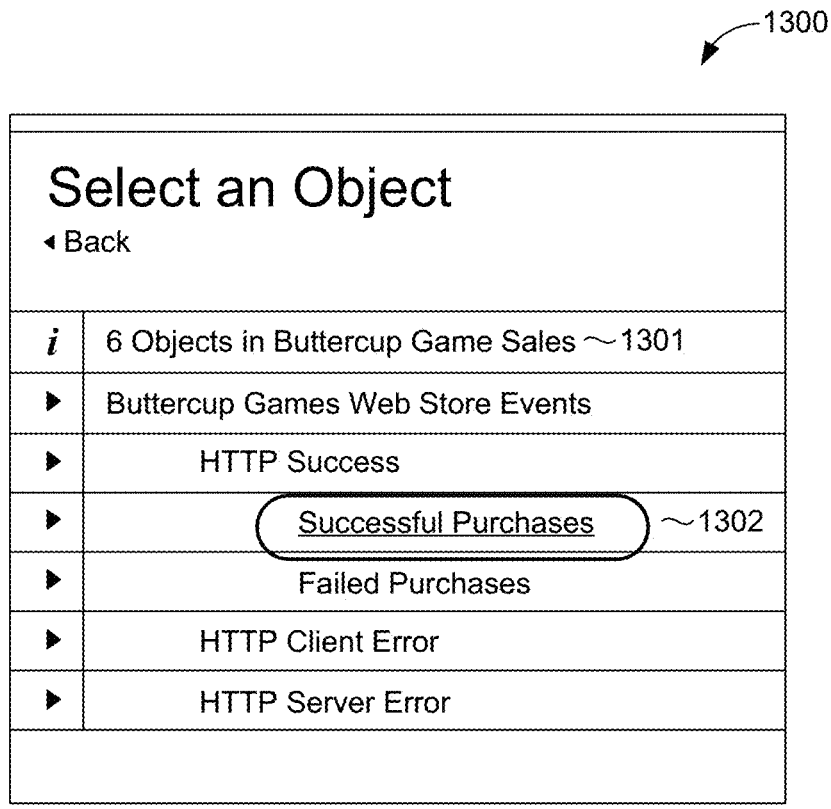

FIG. 13 illustrates an example data model object selection graphical user interface 1300 that displays available data objects 1301 for the selected data object model 1202. The user may select one of the displayed data model objects 1302 for use in driving the report generation process.

Figure 7A:
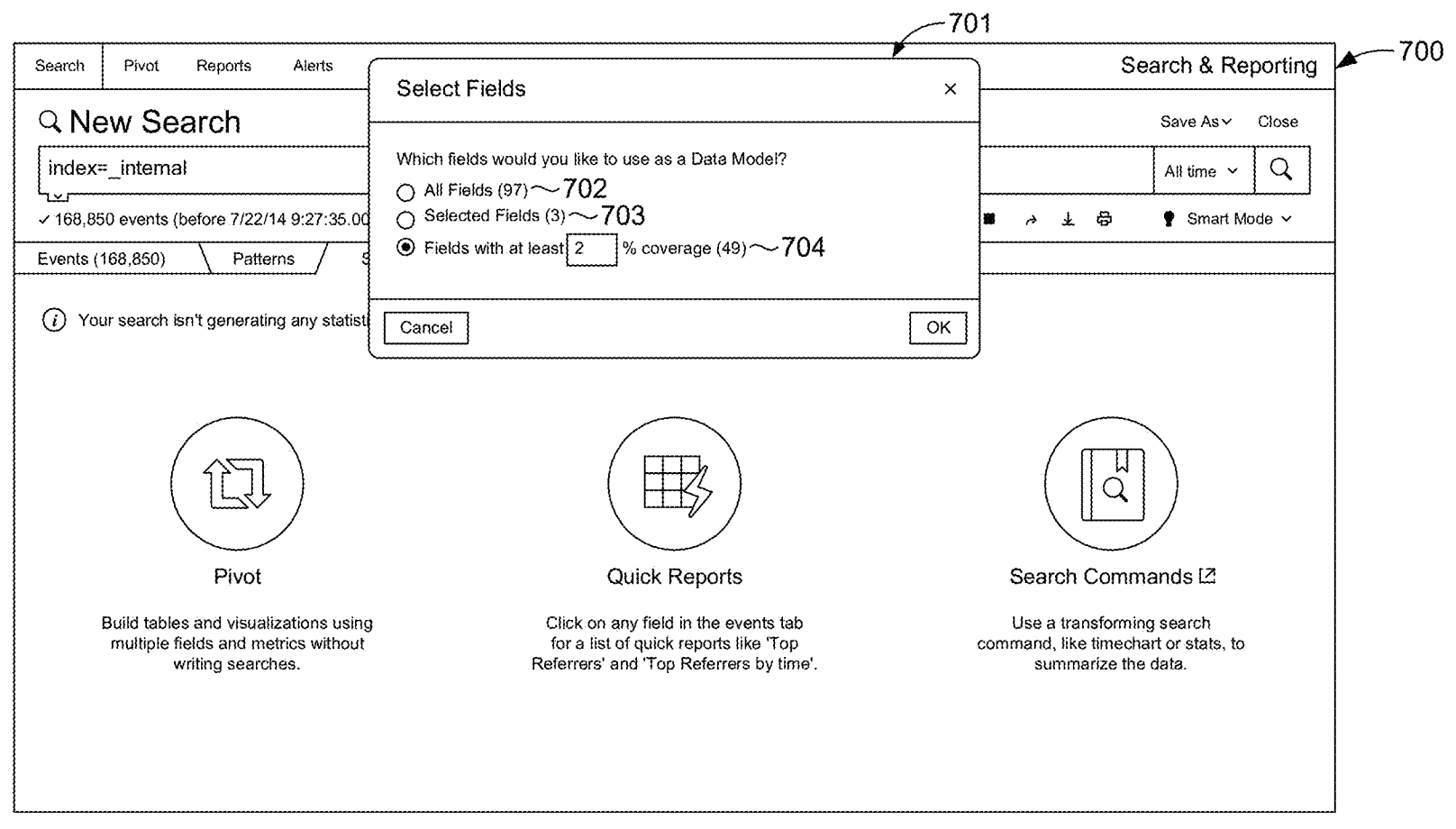

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
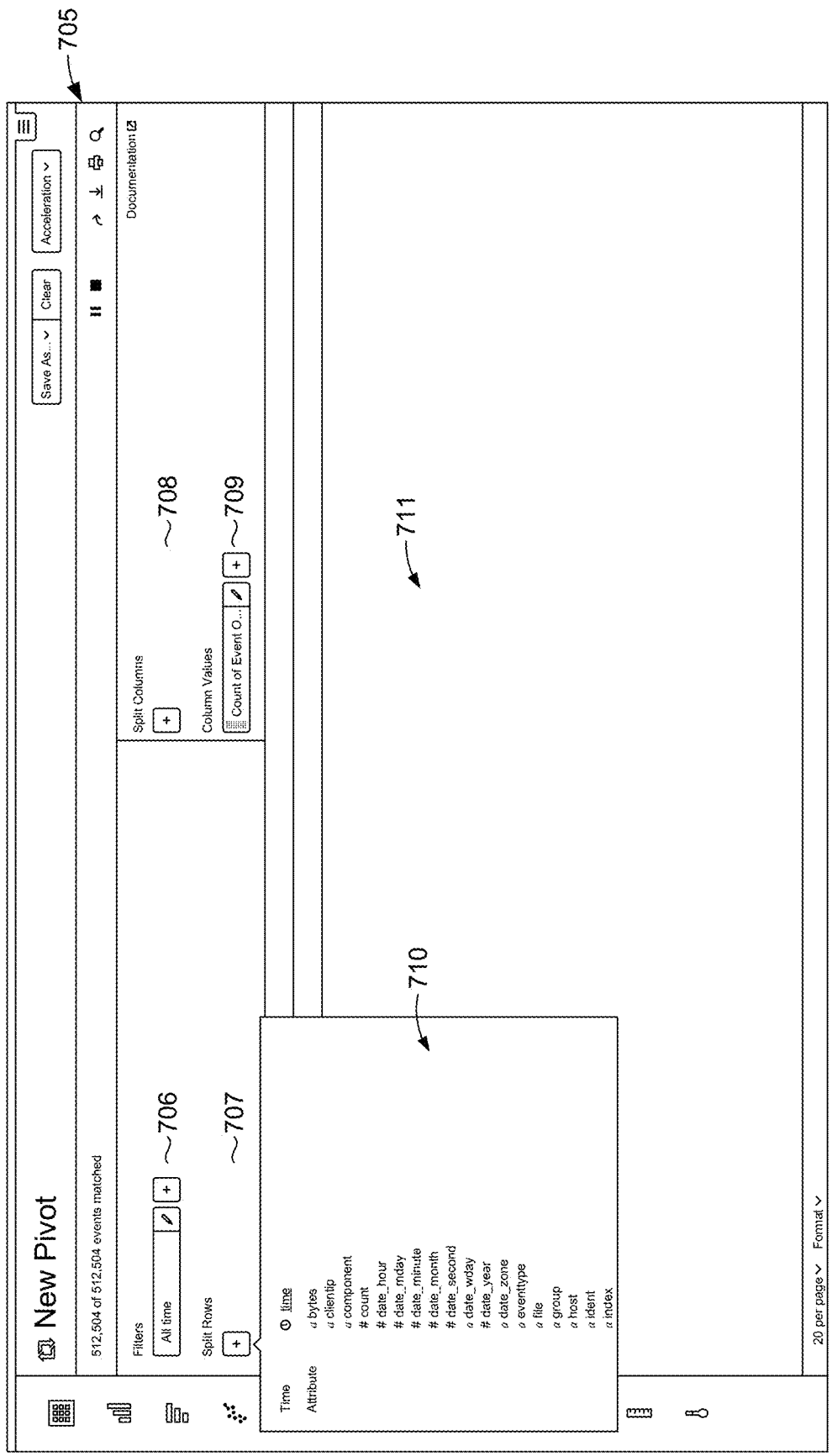
Figure 7C:
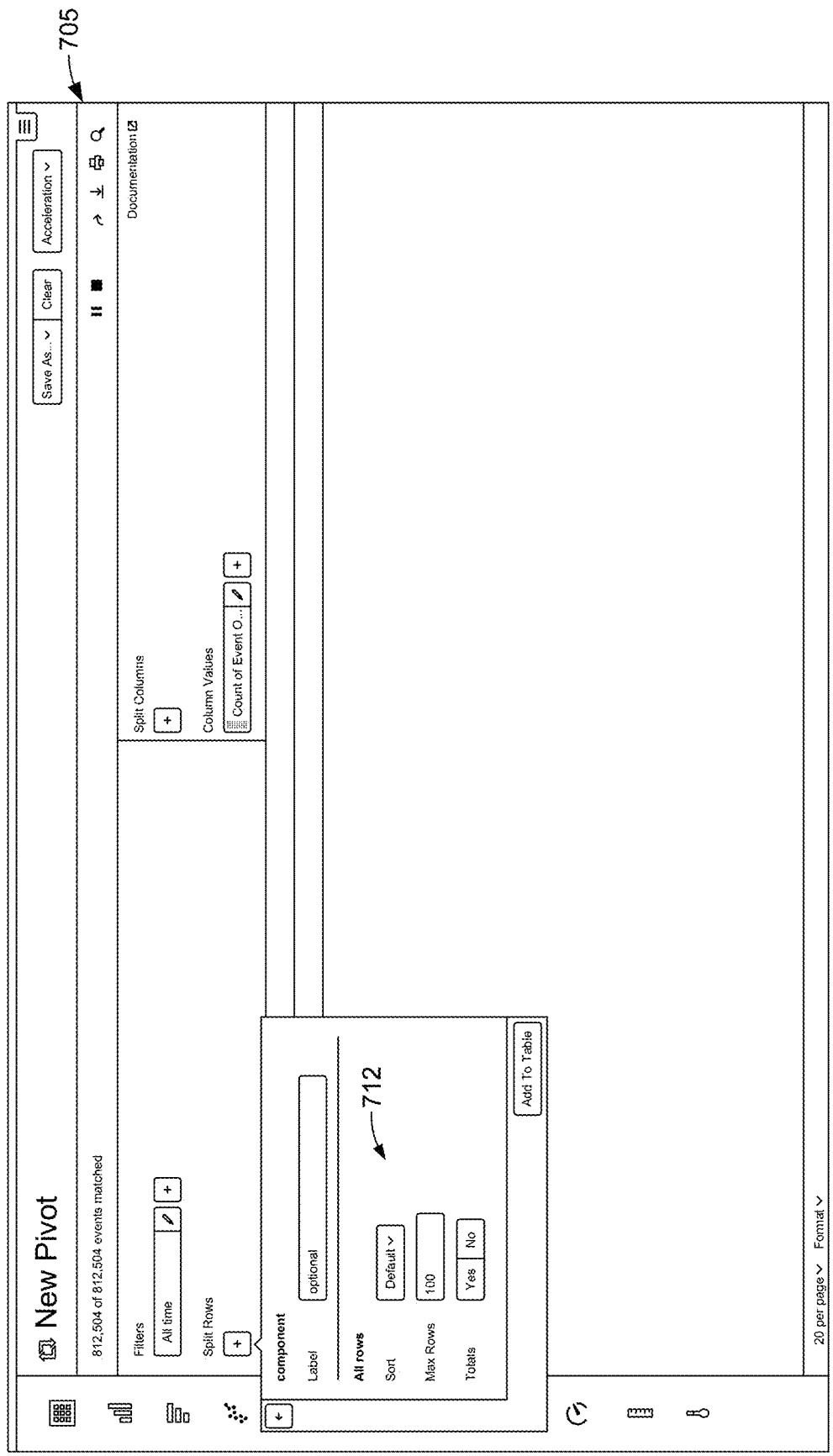

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
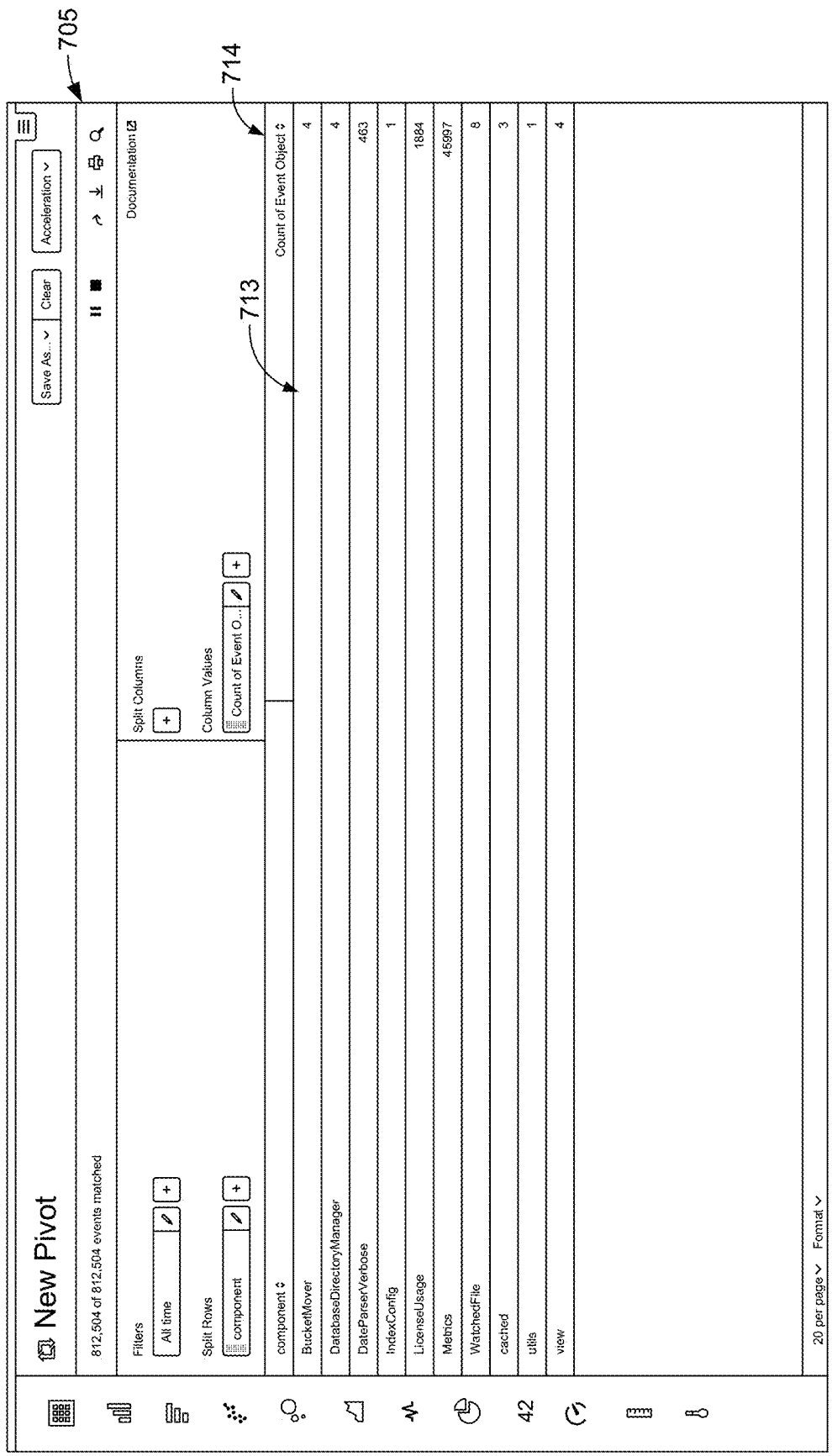

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:
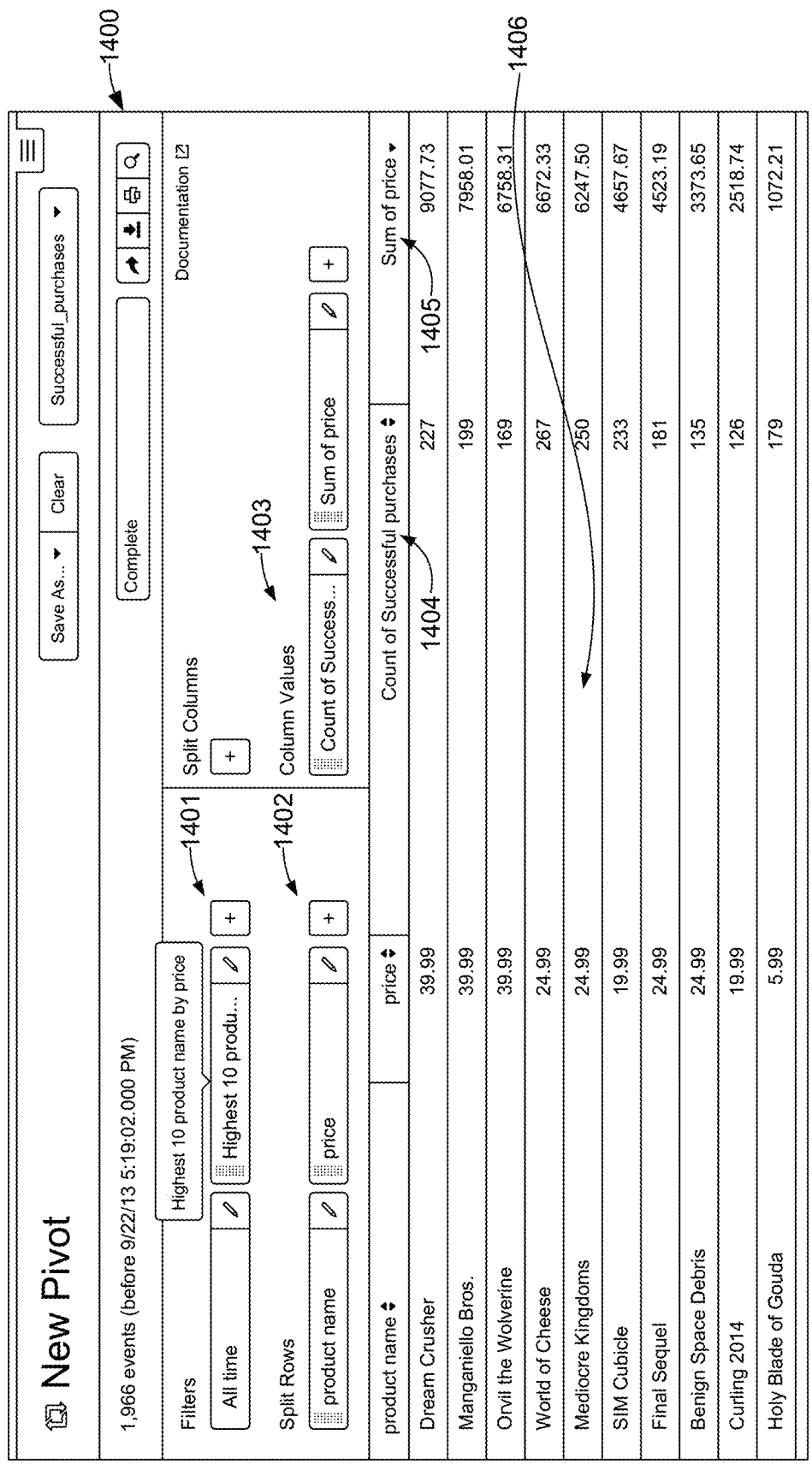

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 16:
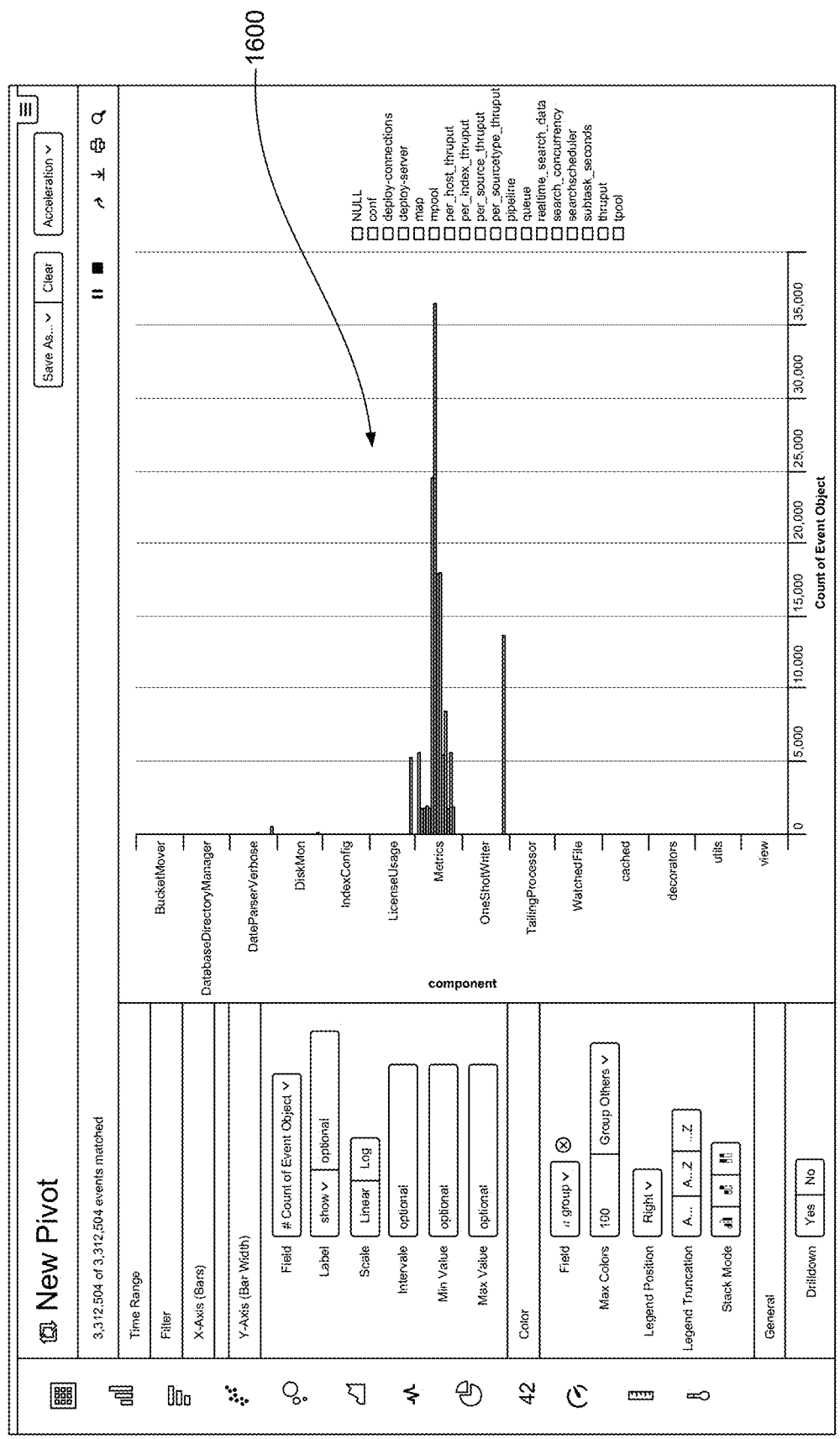
Figure 17:
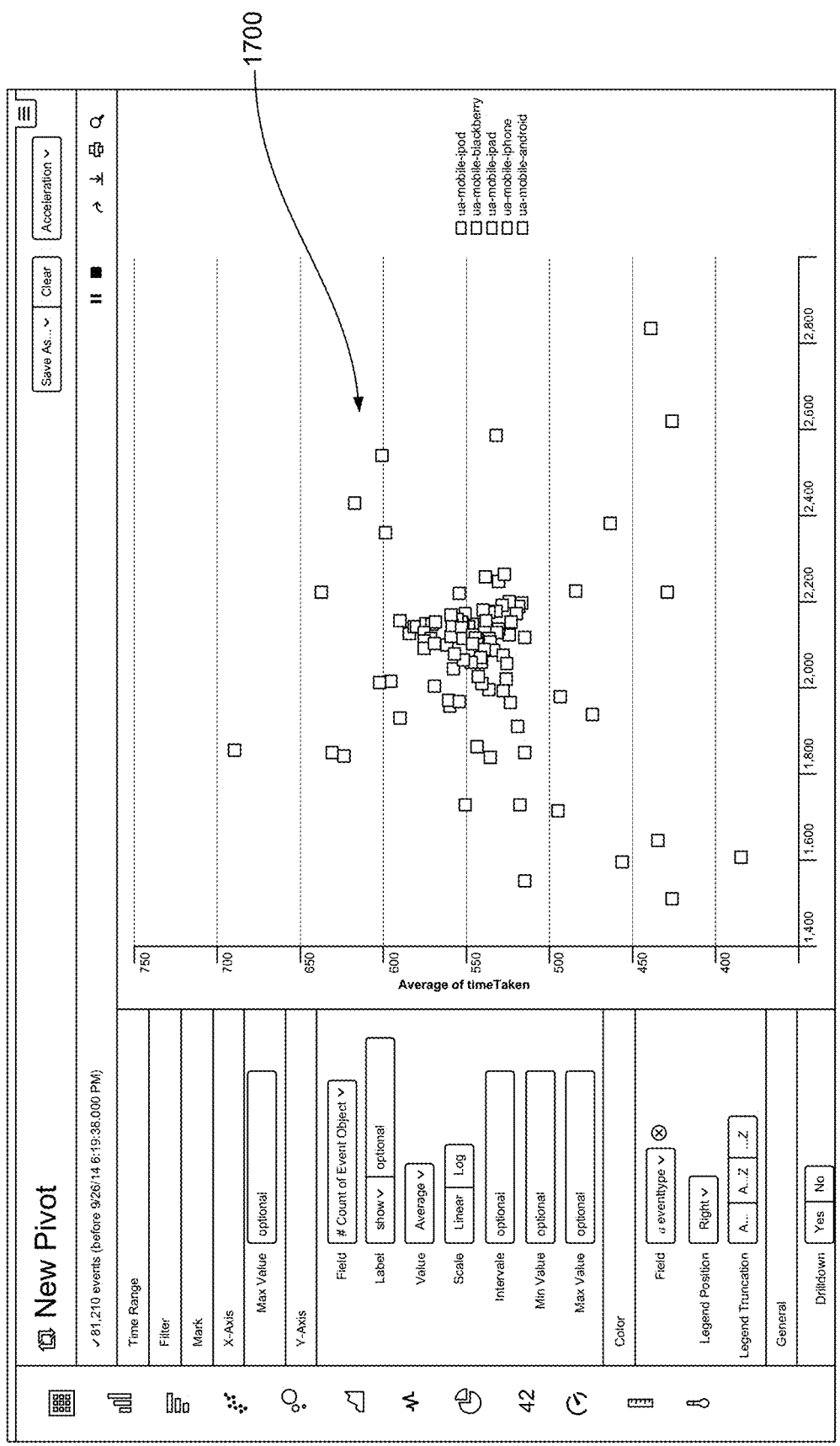

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
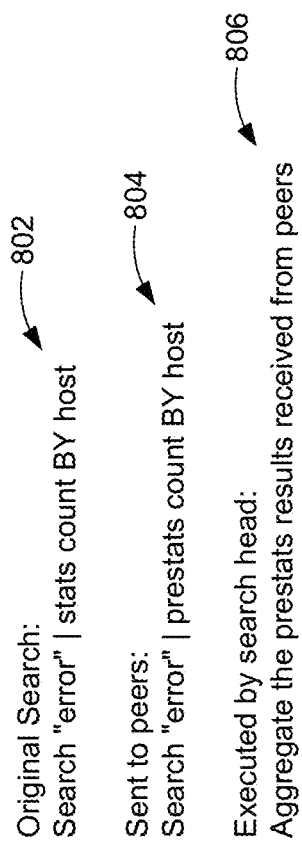
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes.

Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
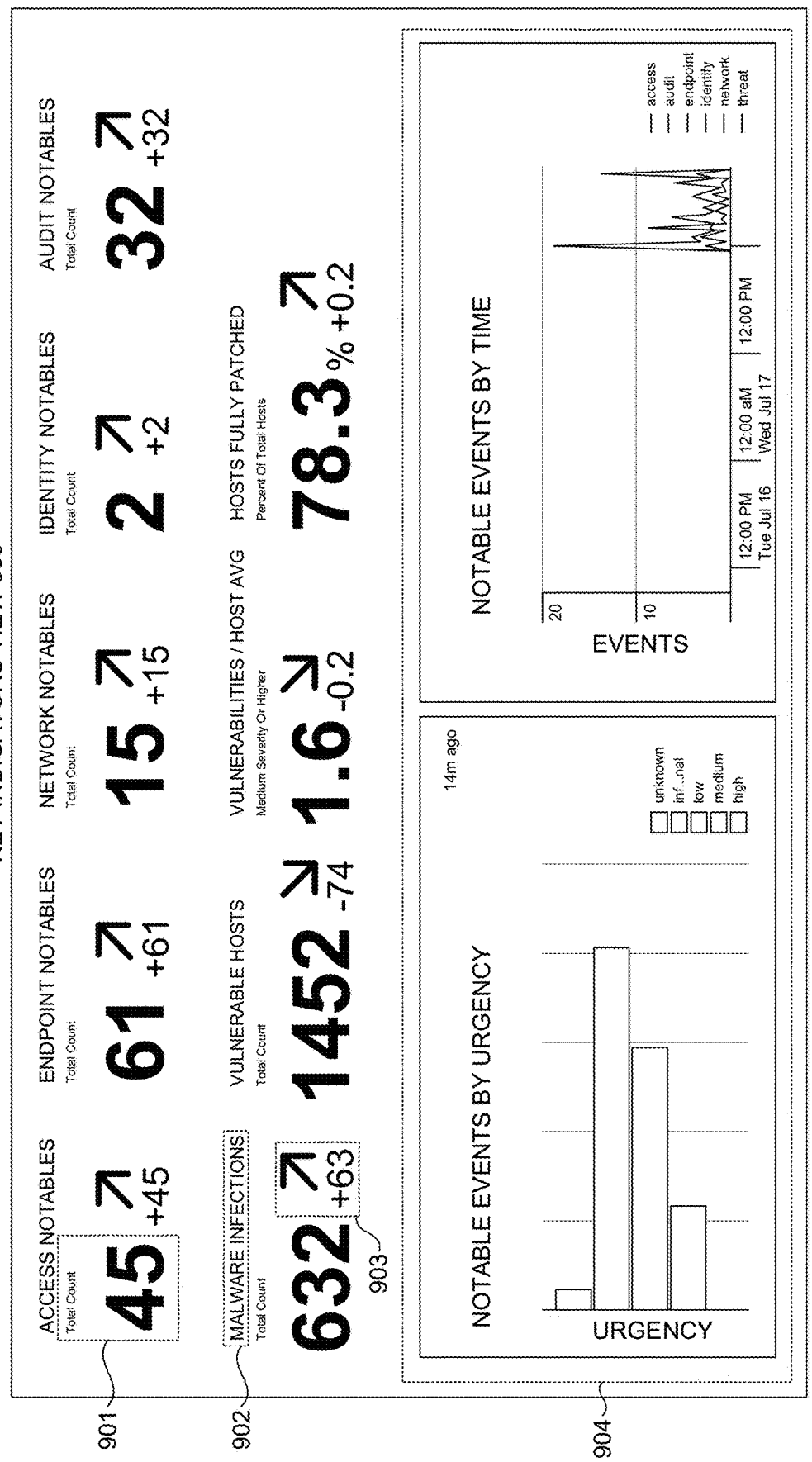
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
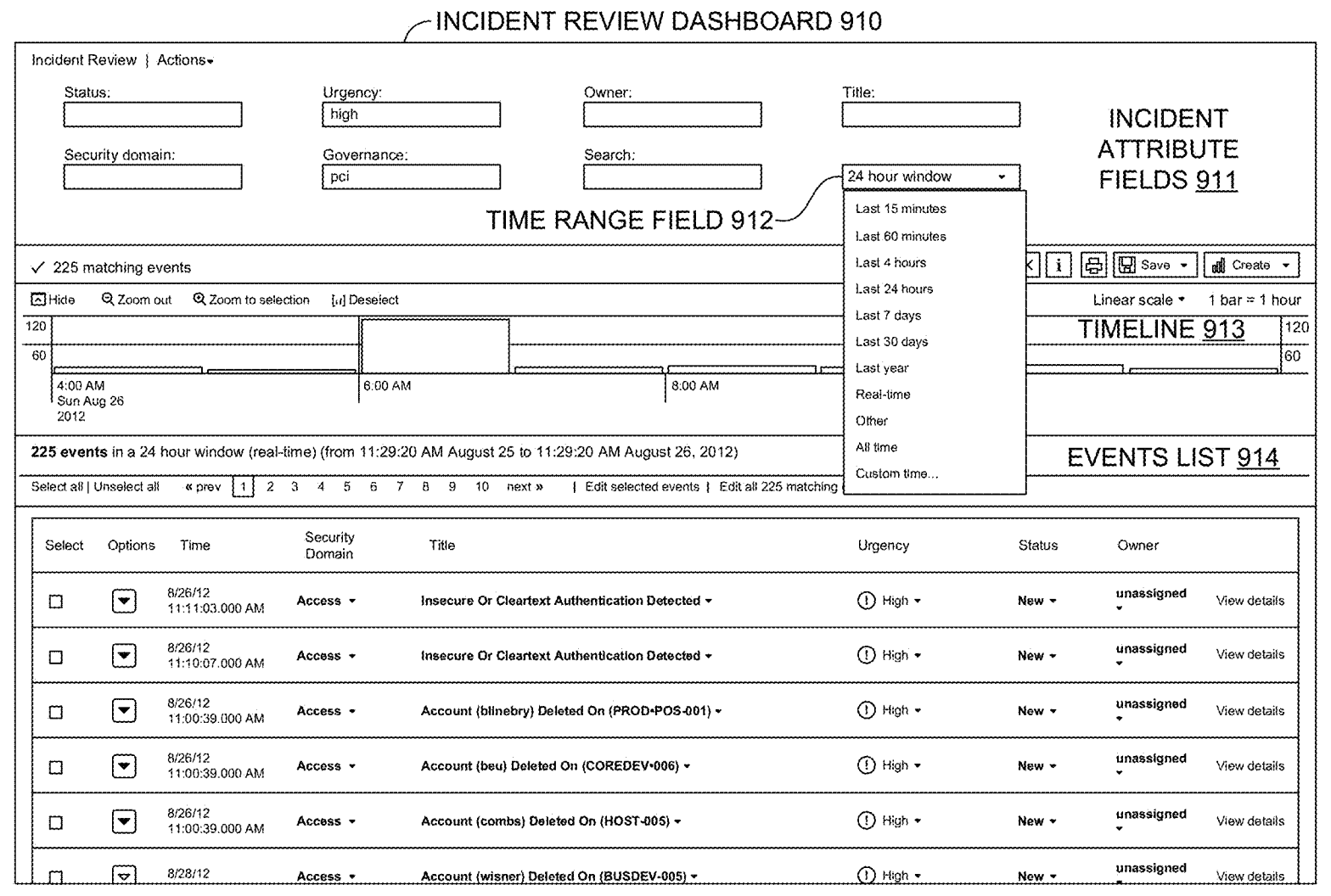

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
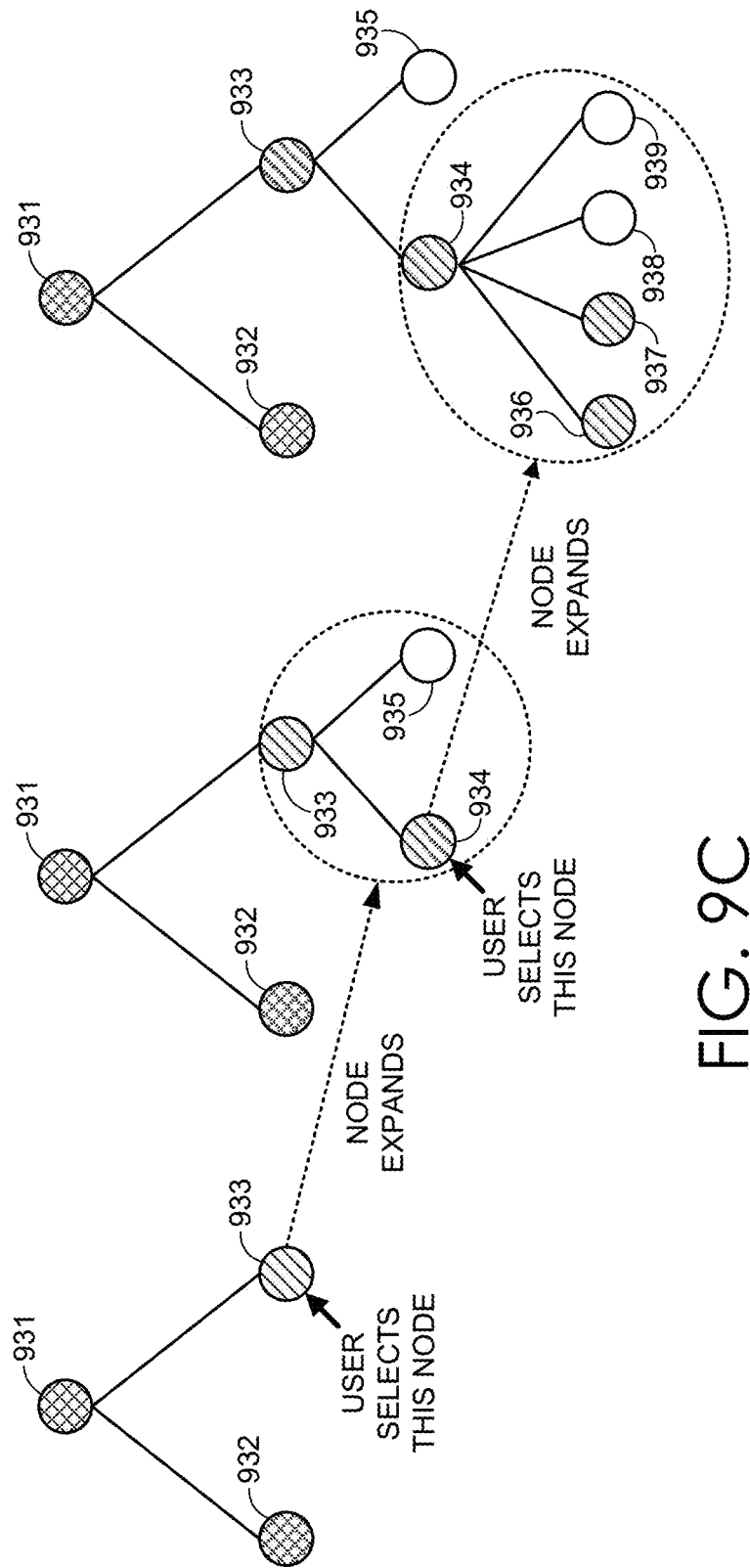
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
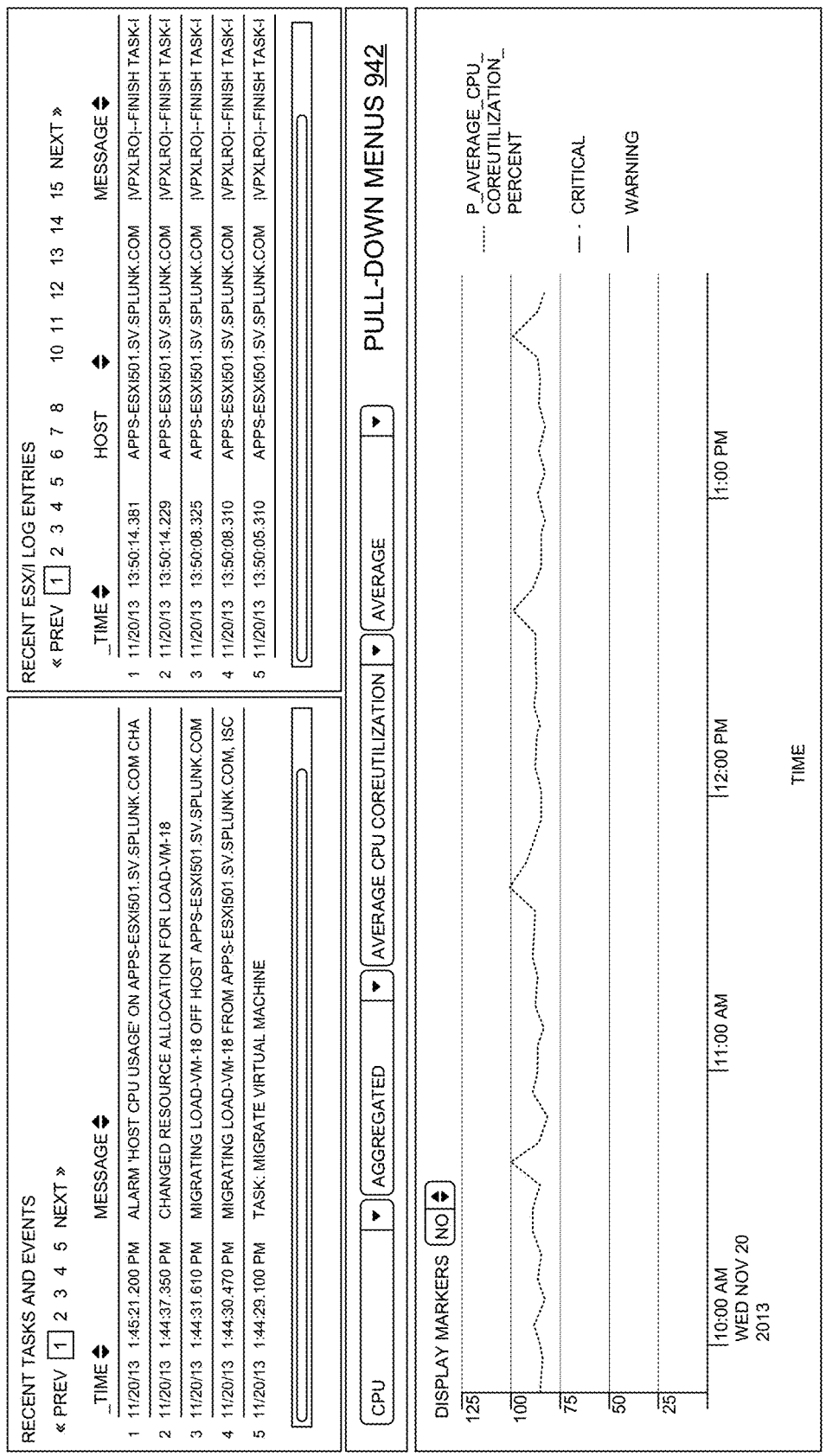
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
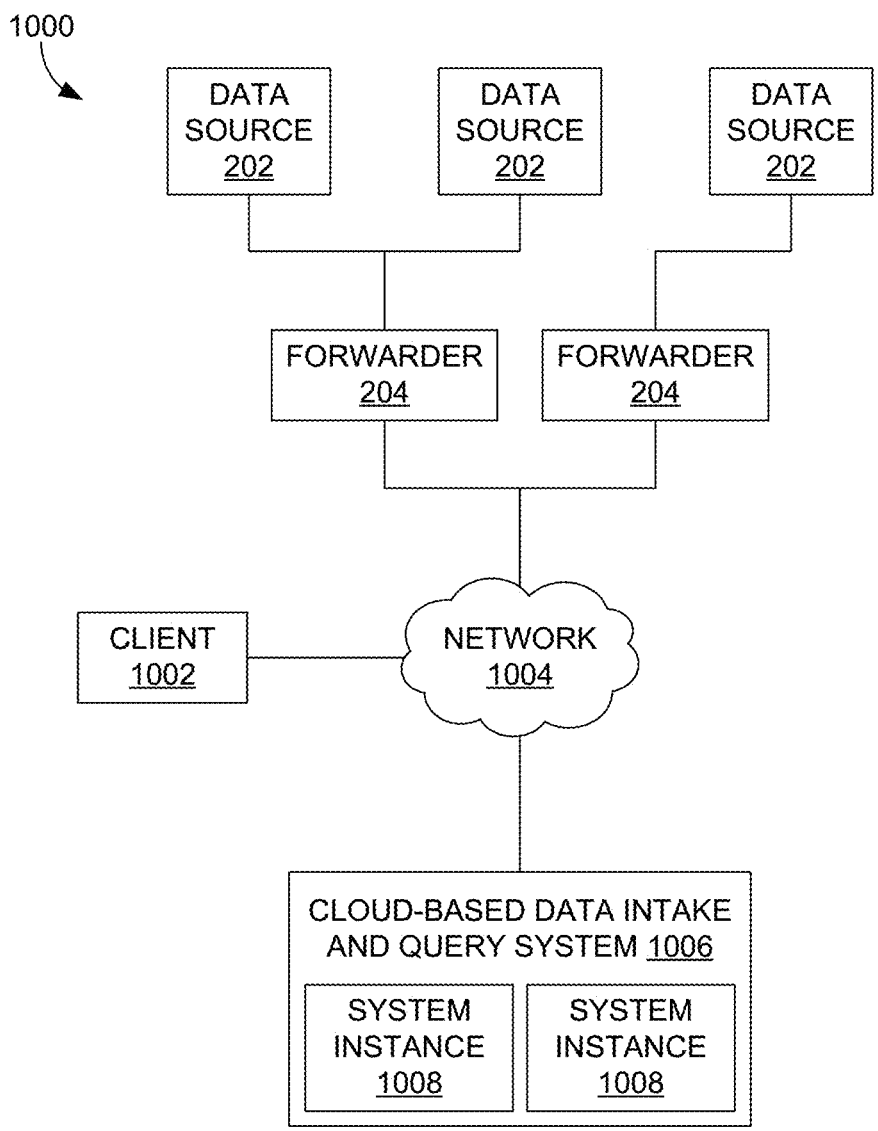
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LAN, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
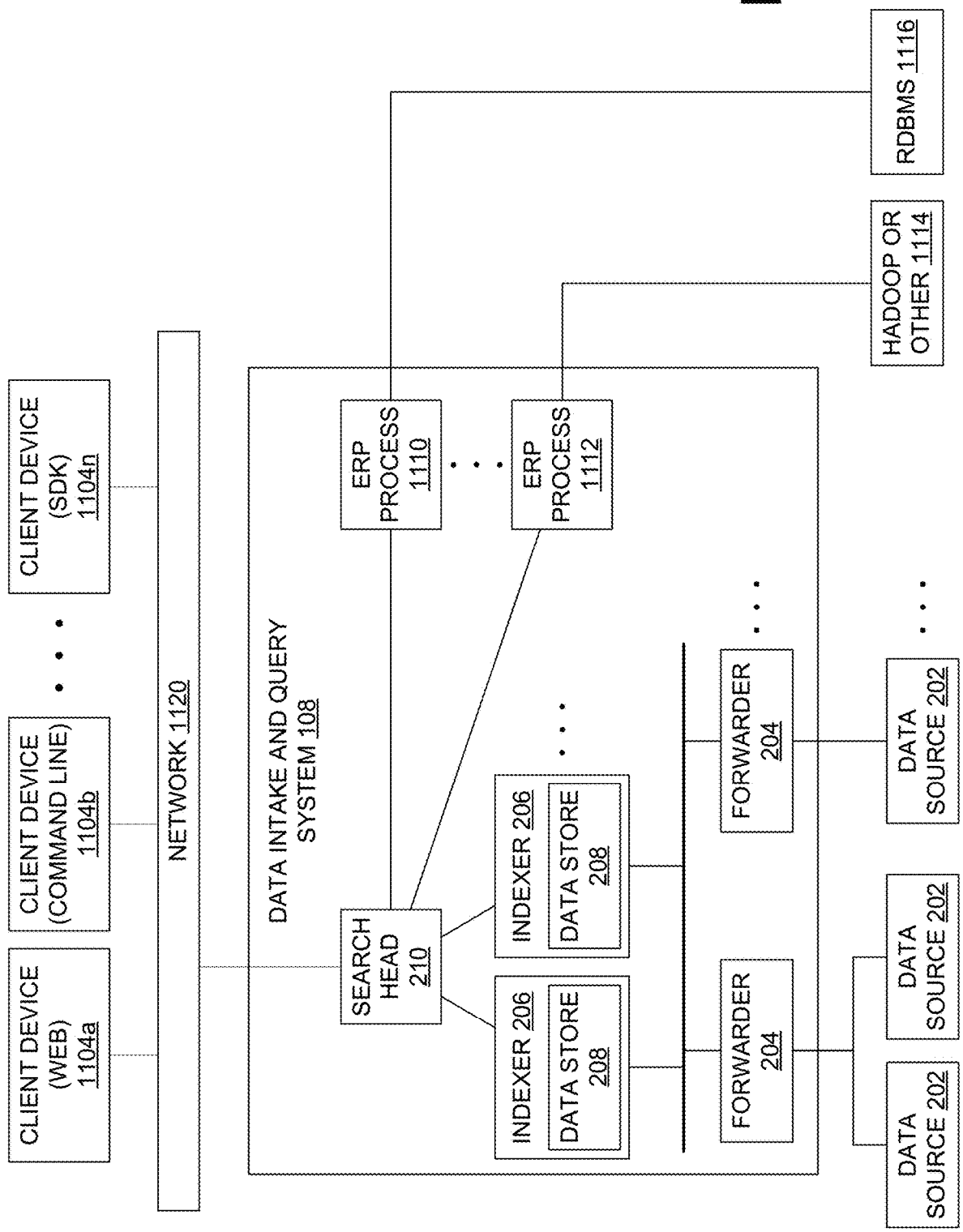
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, California. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, California.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Overview of Online Data Decomposition

Data is often collected as a time series data set, that is, a sequence of data points (e.g., observed data points), typically including successive measurements made over a time interval. Time series data sets are oftentimes decomposed into data components that can each represent a category of patterns in the data. In particular, a time series data set can be decomposed into a trend component that generally reflects a long-term progression of the time series, a seasonal component that generally reflects seasonality or seasonal variation, and a residual component that generally reflects random, irregular influences, or noise (e.g., the remainder of the time series after other data components have been removed). As such, data decomposition can facilitate valuable analysis of data including, for example, anomalies in data as indicated via the residual component.

One conventional method for decomposing data into components is Seasonal and Trend decomposition using LOESS (STL). STL uses locally estimated scatterplot smoothing (LOESS) to extract smooth estimates of trend, seasonal, and residual components. Applying STL to a data set to decompose the data into trend, seasonal, and residual components enables analysis of the data pertaining to data changes (e.g., sudden changes), frequency changes, and anomalies, respectively. For example, anomaly detection algorithms can apply STL to decompose data for anomaly analysis.

Performing data decomposition via STL, however, is resource intensive. In particular, STL generally performs data decomposition via a batch algorithm. In this regard, to estimate data components using STL, an extensive set of data points is analyzed as a batch and used to determine data components. In this way, to estimate data components for a particular data point, preceding and subsequent data points in the batch of data are analyzed and used. For example, assume 1000 data points are collected in a particular time period. In performing batch data decomposition, each of the data points is decomposed based on the other 999 data points. Upon performing data decomposition for each data point in the set (e.g., 1000 data points), the decomposed data components can be output. In addition to the extensive processing time for decomposing each of the data points in the batch set based on preceding and subsequent data points, each of those data points is stored resulting in a significant storage utilization. Further, for any new data point, decomposition is performed for all the data points, which is both time consuming and resource intensive.

Because of the expensive computation associated with utilizing a batch algorithm to decompose components, particularly when being executed for numerous metrics (e.g., related to hosts, CPU, memory, containers, etc.), such execution of data decomposition is generally performed on a periodic basis. For example, because of resource constraints of executing a batch algorithm to decompose data into components, data may be collected and utilized to perform data decomposition every seven days. For instance, the last 28 days of data can be used for performing data decomposition once a week. Such a data decomposition (e.g., performed weekly) can be used to estimate or predict data decompositions until the next batch performance of data decomposition (e.g., one week). The lack of training performed during the time between data decompositions can result in data inaccuracies (e.g., flatness in data).

Accordingly, embodiments described herein perform online data decomposition. In this regard, as an incoming data point is obtained, the data point can be decomposed into a trend component, seasonal component(s), and residual component. Advantageously, data decomposition occurs in real time as a data point arrives without awaiting subsequent data points for use in performing data decomposition. Performing data decomposition in an online manner enables accurate data decomposition as the most recent data is used to facilitate data decomposition. As such, a more accurate data analysis can be performed. For example, trend changes and anomalies can be detected sooner.

Further, only a limited set of previous data points and corresponding data components are stored and used to perform data decomposition for the incoming data point. Using a limited set of previous data points and corresponding data components (e.g., four times a seasonality parameter) to perform data decomposition for an incoming data point decreases utilization of both storage and processing resources. In addition, for an incoming data point, data decomposition is performed for the particular incoming data point and the decomposed components (e.g., trend, seasonal, and residual) are output for the incoming data point. To this end, data decomposition is performed on only the new data point in real-time. Advantageously, data decomposition for previous data points does not need to be performed again thereby reducing resource utilization.

In operation, to perform online data decomposition, an incoming data point is decomposed into a trend component, a seasonal component(s), and a residual component in an iterative manner using a predetermined portion of previous data points and corresponding data components (e.g., trend and/or seasonal components). For example, in accordance with embodiment described herein, an initial, intermediate, and final trend are determined as well as an initial and final seasonal component. The final trend and final seasonal component can then be removed from the data point to determine the residual component. As described herein, to more accurately perform online data decomposition, in one embodiment, a batch data decomposition may be performed with an initial set of data points. In particular, the batch data decomposition can be used to identify seasonal component for such initial data points such that the seasonal components can be used to estimate seasonal components for subsequent incoming data points decomposed in an online manner.

In some cases, multiple seasonalities may be reflected in a set of data points. For example, assume data points are observed on a daily basis. Such a set of data points may exhibit, for example, daily, weekly, monthly, and/or yearly seasonal patterns such that the data contains multiple seasonal effects. As another example, assume data points are observed on an hourly basis. In such a case, the data set may reflect daily seasonality, weekly seasonality, monthly seasonality, and/or yearly seasonality, depending on patterns in the data. Generally, performing higher frequency time series data collection exhibits more complicated seasonal patterns. As higher frequency data collection is becoming more common, multiple seasonal patterns more frequently occur within the data. As such, identifying such multiple seasonal components can be valuable in analyzing the data (e.g., a time series data set). For example, a user may desire to view both weekly and monthly seasonalities associated with a data set, as both can contribute different aspects of valuable information (e.g., for planning, scheduling, managing purposes). Further, identifying multiple seasonal components in the data can provide a more accurate trend and/or residual component, as well as more accurate data forecasting. As such, in cases in which a user may desire to accurately view a trend in the data or view data anomalies, identifying and removing multiple seasonal components can provide a more accurate determination of trend and/or residual components. Determining multiple seasonal components in a data set, however, can be difficult. As many conventional data decomposition implementations are unable to deal with the complexity of multiple seasonalities, such conventional data decomposition implementations generally only decompose data into a single seasonal component via batch processing.

Accordingly, embodiments described herein relate to performing online data decomposition in accordance with determining multiple seasonal components. Stated differently, multiple seasonal components are determined via online data decomposition. In this regard, a data point is decomposed into various data components including multiple seasonal components. In determining multiple seasonal components via online data decomposition, data decomposition is performed on only the new incoming data point in real-time. Advantageously, data decomposition for previous data points does not need to be performed again thereby reducing resource utilization. The determined multiple seasonal components can be used to further decompose the incoming data point to determine a corresponding trend component and residual component. As such, in accordance with performing only decomposition via multiple seasonal components, an incoming data point can be decomposed into multiple seasonal components, a trend component, and a residual component. Such data components may be presented to a user and/or utilized for further analysis (e.g., to analyze outlier data).

In operation, to perform online data decomposition in accordance with multiple seasonal components, an iterative process is performed to identify each seasonal component. Generally, the determined seasonal components correspond with input seasonality parameters (e.g., provided by a user). For example, assume a user provides a first seasonality parameter, a second seasonality parameter, and a third seasonality parameter. In such a case, for an incoming data point, a first iteration of a process is executed to identify a first seasonal component associated with the first seasonality parameter, a second iteration of the process is executed to identify a second seasonal component associated with the second seasonality parameter, and a third iteration of the process is executed to identify a third seasonal component associated with the third seasonality parameter. The first, second, and third seasonal components are removed to determine a trend and a residual associated with the incoming data point. The set of data components, including the multiple seasonal components, trend, and residual, can be provided in a real-time manner, for instance, for presentation to a user and/or for performing further data analysis (e.g., to provide data alerts, anomaly analysis, etc.).

Figure 24:
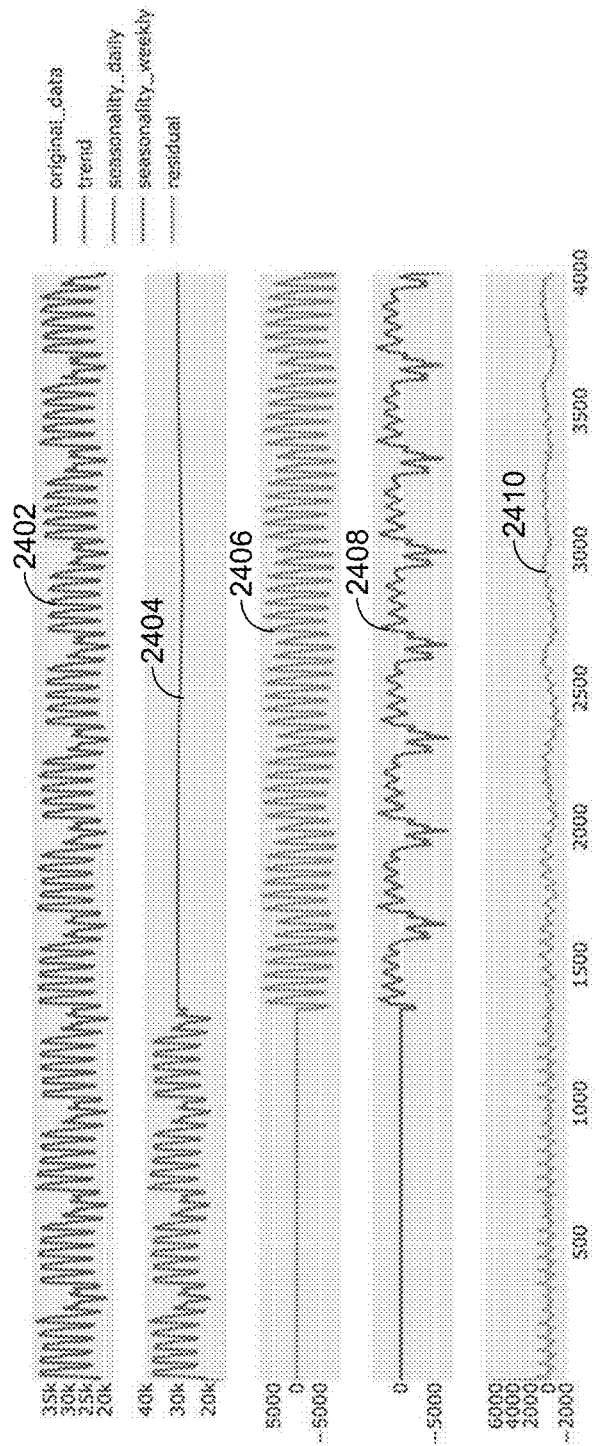
FIG. 24 illustrates one example of a graphical display of various data components, including multiple seasonal components, in accordance with embodiments of the present disclosure.

By way of example, and with reference to FIG. 24, FIG. 24 illustrates a set of original data and data decomposed in accordance with multiple seasonal components. Each data point in the original data 2402 generally equals the corresponding trend 2404, first seasonal component 2406, second seasonal component 2408, and residual 2410. In operation, as an incoming data point of original data 2402 is obtained, corresponding data components are determined. In this example, the corresponding trend 2404, first seasonal component 2406, second seasonal component 2408, and residual 2410 are determined and can be provided for presentation to a user or utilization for further data analysis. As can be appreciated, although two seasonal components are provided in this example, any number of seasonal components may be determined from the original data.

In this example, assume data is observed or collected every half hour. In this regard, each data point is collected on a half hour interval, as shown on the x-axis. With data collected every half hour, a user desiring to view or analyze a daily seasonality, or 24 hour seasonality, can input a seasaonality parameter of 48. As another example, a user desiring to view or analyze a weekly seasonality can input a seasonality parameter of 336 (e.g., 336 half hourly data points in a weekly period). Assuming the user interested in daily and weekly seasonality provides seasonality parameters of 48 and 336, the first seasonal component 2406 and the second seasonal component 2408 are determined for incoming data points. In particular, the first seasonal component 2406 represents a decomposition of the original data into daily seasonality, and the second seasonal component

2408 represents a decomposition of the original data into weekly seasonality. The first seasonal component 2406 and the second seasonal component 2408 are removed from the original data to facilitate deriving the trend 2404. The residual 2410 can be determined based on removing the trend 2404, first seasonal component 2406, and second seasonal component 2408 from the original data 2402.

3.1 Overview of a Data Decomposition Engine

Embodiments described herein are directed to facilitating data decomposition in an online manner. In particular, as an incoming data point is obtained, data decomposition can be performed to deconstruct the data point into components, such as, for example, trend, seasonal(s), and/or residual. Performing data decomposition in an online manner, as described herein, facilitates processing or pre-processing of data in an ongoing and efficient manner. As such, data analysis can be performed in real-time thereby providing more timely results to users. To this end, online data decomposition can provide decomposed data results immediately based on a set of previously obtained data points (e.g., stored in a buffer), such that awaiting subsequent data points is not needed to perform data decomposition. Such an efficient and accurate identification of data components (e.g., trend, seasonal(s), and residual) for an incoming data point enables further data analysis, such as, among other things, anomaly detection and drift detection, to be performed in a more up-to-date and accurate manner.

Figure 18:
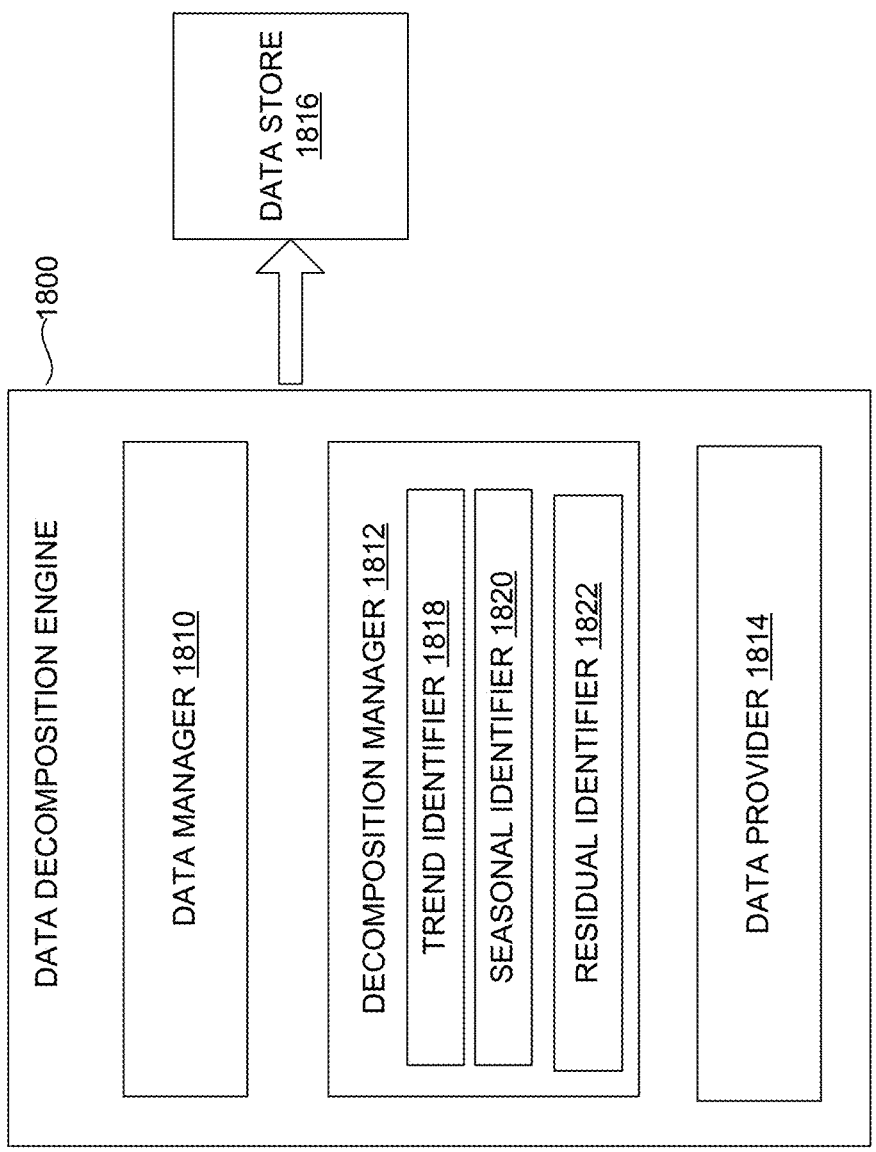
FIG. 18 depicts a block diagram of a data decomposition engine, in accordance with various embodiments of the present disclosure.

Turning to FIG. 18, FIG. 18 illustrates an example data decomposition engine 1800, in accordance with embodiments described herein. The data decomposition engine 1800 is generally configured to facilitate online data decomposition. In this regard, the data decomposition engine 1800 generally decomposes data into data components. Data components, or components, refer to components or aspects of a data, or a data point, that indicate a characteristic or behavior of the data. As described herein, data may be decomposed into trend, seasonal(s), and residual components. Advantageously, in accordance with embodiments described herein, the data decomposition engine 1800 can perform data decomposition in an online manner. As such, as a data point is obtained by the data decomposition engine 1800, the data point can be analyzed and decomposed into a trend component, a seasonal component(s), and a residual component. Importantly, the data decomposition engine 1800 can decompose a data point in an online manner to attain multiple seasonal components that reflect various seasonalities associated with the data point. Such a real-time decomposition, as described herein, can be performed efficiently with regard to both time and resources.

Generally, the data being decomposed corresponds with a time series data set. A time series data set refers to a series of data points obtained at successive times. As such, an incoming data point can be one data point of a time series data set. Time series data can exhibit different types of patterns, such as trend and seasonality and, in some cases, multiple seasonalities. One approach to identifying how each of these patterns behaves is to break the time series into distinct components that each represent a specific pattern, such as trend and seasonality(s). As such, time series data can be analyzed to decompose the data to extract characteristics, or patterns, of the data. The decomposition of time series data generally deconstructs the data into several data components, each representing one of the underlying categories of patterns. Such data components include trend, seasonal(s), and residual. As described herein, data may be deconstructed into multiple seasonal components as the data may reflect multiple seasonalities.

A trend component (at time f) generally refers to the long-term progression of a series of data points. For example, a trend can represent a persistent increasing or decreasing direction in the data. Identification of a trend component can facilitate analysis of sudden changes in a data set. In some cases, a trend component may encompass a cyclical behavior. For example, a data decomposition may decompose a data set into trend, seasonal, and residual components, wherein a cyclical component, if present in the data, is included in the trend. A cyclical component (at time t) generally refers to repeated but non-periodic fluctuations.

A seasonal component (at time t) generally refers to seasonality, or seasonal variation. A seasonal pattern can represent when a data set (e.g., time series data set) is influenced by seasonal factors. Seasonality can occur over a fixed period (e.g., quarter of year, month, day of the week, etc.). Identification of a seasonal component can facilitate analysis of frequency changes in a data set. As described, data may reflect different seasonalities and, as such, embodiments described herein can identify multiple seasonal components that indicate the different seasonalities.

A residual component (at time t) generally refers to an irregular or "noise" component, which describes random, irregular influences. A residual component represents the residuals or remainder of a data set (e.g., time series) after other components (e.g., trend and seasonal(s) components) have been removed. Identification of a residual component can facilitate identification of anomalies. In this regard, upon removing trend and seasonal components from data, anomalies can more easily (e.g., accurately and efficiently) be identified.

The data decomposition engine 1800 can be implemented as server systems, program modules, virtual machines, components of a server or servers, networks, and the like. The data decomposition engine 1800 may be in communication with the data store 1816 to store and access data. In embodiments, the data decomposition engine 1800 can provide data to the data store 1816 for storage, which may be retrieved or referenced by any component of the data decomposition engine 1800.

The data store 1814 may be any data store configured to store data, such as data points and/or corresponding data components. In some embodiments, the data store 1814 may be or include a cache or buffer for storing data points and/or corresponding data components. A data store (e.g., buffer) may be configured to store only a certain number of data points and/or corresponding data components (e.g., trend, seasonal(s), and/or residual components). For example, a multiple of a seasonality parameter (e.g., four times a seasonality parameter) may be used to specify a number of data points for which data may be stored in a buffer. The data store 1816 may be any type of data storage. In embodiments in which multiple seasonal components are determined, a multiple of one of the seasonality parameters may be used to specify a number of data points for which data may be stored (e.g., in a buffer). For instance, a multiple of a smallest or a largest seasonality parameter may be used to determine a number of data points to store.

As illustrated in FIG. 18, the data decomposition engine 1800 includes a data manager 1810, a decomposition manager 1812, and a data provider 1814. The data decomposition engine 1800 can include any number of other components not illustrated. In some embodiments, one or more of the illustrated components 1810, 1812, and 1814 can be integrated into a single component or can be divided into a number of different components. Components 1810, 1812, and 1814 can be implemented on any number of machines and can be integrated, as desired, with any number of other functionalities or services.

The data manager 1810 is configured to manage data, such as incoming data points. A data point generally refers to any data, such as an observed data. An incoming data point, or current data point, refers to a data point that is arriving at the data decomposition engine 1800. An incoming data point may be a most recently received data point for which to perform data decomposition. In this regard, data decomposition has already been performed for previously received data points and such previously received data points and/or components thereof can be used to decompose the incoming data point. In some embodiments, a data point corresponds with a time series data set. As such, an incoming data point can be one of a sequence of data points of a time series data set collected over time.

Generally, the data manager 1810 obtains an incoming data point, for example, provided via a data source. The data manager 1810 can obtain or collect data points from any number of data sources. As one example, data points observed and collected at client devices or servers can be provided to the data manager 1810. In this regard, as a data point is observed or collected at a client component, the client component can communicate the data point to the data decomposition engine 1800 such that data points are obtained at the data manager 1810 in an ongoing or streaming manner (e.g., a most recently received data point without having obtained subsequent data points).

The data manager 1810 can provide obtained data points to the data store 1816. As can be appreciated, the data point can be stored in the data store 1816 in association with a particular metric. That is, an incoming data point may be a part of a time series data set associated with a particular metric. A metric generally refers to any type or category of measurement, such as, for example, a performance metric or a security metric. For example, a time series data set may relate to a particular performance or usage of containers, hosts, CPU, memory, or the like.

Additionally or alternative, the data manager 1810 may provide incoming data points to the decomposition manager 1812 for data processing. As such, upon obtaining a data point, the data manager 1810 may provide the data point to the decomposition manager 1812 in a real-time basis for performing data decomposition. In some cases, the data manager 1810, or another component, may facilitate any pre-processing of the data before it is stored in data store 1816 and/or provided to the decomposition manager 1812.

As described herein, in some embodiments, to perform online data decomposition, an initial portion of a data set may be decomposed in a batch. To perform data decomposition in batch mode, a set of data points are collected and processed, or decomposed, as a group. In such a case, data manager 1810 may track or monitor incoming data points to identify when a set of data points to be decomposed as a group have been collected. Upon collecting the set of data points to be decomposed in batch mode, the data manager 1810 can provide the set of data points to the decomposition manager 1812 for processing via batch mode, or otherwise provide an indication to the decomposition manager 1812 that batch processing can be initiated. By way of example only, assume a set of twelve data points is desired for performing batch processing. Upon obtaining an initial twelve data points, such data points can be retrieved by the data manager 1810 from the data store 1816 and provided to the decomposition manager 1812. Alternatively, the data manager 1810 can provide an indication to the decomposition manager 1812 that a set of data points have been collected for batch processing and, thereafter, the decomposition manager 1812 can obtain the data points from the data store 1816.

In some cases, the data manager 1810 may also be configured to facilitate removal or discarding of data points, and/or corresponding data components, from the data store 1816. As described herein, advantageously, only a portion of data points, for example of a time series data set, are used to decompose a data point into components. As such, in some embodiments, only the portion of data points used for decomposition of a particular data point are stored in data store 1816. The portion of data used for decomposition may also be referred to herein as a window size. A window size refers to a size, quantity, or number of data points (e.g., observations) and/or corresponding data components to use for performing data decomposition. In some cases, the window size may be specific to estimating trend components, estimating seasonal components, or both. A window size may be determined or defined in any number of ways. As one example, a window size may be a multiple of a seasonality parameter. A seasonality parameter generally refers to a parameter indicating a seasonality. Such a seasonality parameter may be defined by a user for a data set or for a particular execution(s) of data decomposition.

In accordance with determining multiple seasonal components, multiple seasonal components may be provided for a data set or execution(s) of data decomposition. For instance, a user may provide a first seasonality parameter to indicate a first desired seasonal component and a second seasonality parameter to indicate a second desired seasonal component. As can be appreciated, any number of seasonality parameters may be obtained or provided for determining corresponding seasonal components. In cases that multiple seasonality parameters are provided, one of the seasonality parameters may be used to determine a window size. For example, a largest seasonality parameter or a smallest seasonality parameter may be selected and used to determine a window size (e.g. a multiple of the selected seasonality parameter).

Further, as described herein, a window size may vary between iterations of estimating data components. As such, in some cases, the portion of data points and/or corresponding data components stored may correspond with the greatest or largest window size. For instance, assume a window size of 12 is used for estimating trend in one iteration and another window size of 9 is used for estimating trend in another iteration. In such a case, the previous 12 data points and corresponding data components may be stored. In other cases, the portion of data points and/or corresponding data components stored may vary with the window size. For example, assume a first trend iteration uses a window size of 12 data points to estimate trend and a second trend iteration uses a window size of 9 seasonal components to estimate trend on seasonality. In such a case, the previous 12 data points may be stored and 9 seasonal components may be stored.

To remove or discard appropriate data (e.g., data points and/or corresponding components) from a data store, the data manager 1810 may identify data outside a portion of a data set (e.g., window size) used to perform data decomposition and initiate discarding of such data from the data store 1816. As one example, upon obtaining a window size of data points (e.g., 12 data points), as a new data point is obtained (e.g., a 13th data point), the data manager 1810 may initiate removal of an earliest data point (and corresponding components) of the set of data points in the data store 1816.

Accordingly, the data store 1816 can maintain a fixed and minimal number of data points. Advantageously, minimizing the number of data points stored and utilized to perform data decomposition reduces both storage resources and processing resources.

In some embodiments, the data manager 1810 may be configured to recognize whether data points are to be processed in batch mode and/or in online mode. For example, until a window size of data points is initially obtained, the data manager 1810 may recognize that a data point is to be processed, or decomposed, using both a batch mode and an online mode. In this regard, the data point may be provided for data decomposition in an online mode and stored for batch mode processing. Upon obtaining a window size of initial data points (e.g., a number of data points equal to four times a seasonality parameter), the data manager 1810 may recognize that an online processing mode applies.

Based on recognizing the processing mode to apply to an incoming data points, the data manager 1810 may obtain, provide, and/or discard data points accordingly. For instance, when in batch processing mode, the data manager 1810 may collect the window size of data points and provide to the decomposition manager 1812 as a group for decomposition without any data points being discarded from the data store. On the other hand, when only operating in an online processing mode, the data manager 1810 may provide data to the decomposition manager 1812 and/or discard data from the data store 1816 in an ongoing manner as incoming data points are obtained. As can be appreciated, and described below, in some cases, the online processing mode may be implemented concurrently with batch processing mode. For example, online decomposition may be performed for all incoming data points, while batch decomposition may be performed in connection with a window size of initial data points.

The decomposition manager 1812 is generally configured to manage data decomposition. As described throughout, data points (e.g., of a time series) can be decomposed into various components, such as trend, seasonal, and/or residual. Decomposing data into such components enables data to be further, and oftentimes, more accurately analyzed. For example, determining a residual component facilitates identification of anomalies in data.

In embodiments, the decomposition manager 1812 includes a trend identifier 1818, a seasonal identifier 1820, and a residual identifier 1822. In this regard, to determine trend, seasonal, and residual components, a trend identifier 1818, seasonal identifier 1820, and residual identifier 1822 may be used. Trend identifier 1818, seasonal identifier 1820, and residual identifier 1822 are illustrated separately for explanation purposes, but need not be the case. Further, only a single trend identifier, seasonal identifier, and residual identifier is shown, but embodiments described herein may implement various iterations of determining trend and seasonal components via multiple identifiers (e.g., a first trend identifier for determining an initial trend, a second trend identifier for determining an intermediate trend, and a third trend identifier for determining a final trend).

The trend identifier 1818 is generally configured to identify or determine trend. In particular, the trend identifier can determine a trend (e.g., initial trend, intermediate trend, and/or final trend) for a particular data point. The trend identifier 1818 can be implemented to determine a trend in any number of ways. As one example, a kernel smoothing filter technique can be used to identify a trend component. Kernel smoothing is a technique to estimate a real value function as the weighted average of neighboring data points. The weight is defined such that closer data points are given higher weights. The estimated function is smooth, and the level of smoothness is set by a single parameter (window size). Various kernel smoothers include Gaussian kernel smoother, nearest neighbor smoother, kernel average smoother, local linear regression, local polynomial regression, or the like. In one embodiment, the trend identifier 1818 uses a cubic kernel smoothing filter technique to identify trend.

Advantageously, and in accordance with embodiments described herein, trend can be determined using a number of data points (and/or corresponding components) that correspond with a defined window size. As described, a window size refers to a number of data (e.g., observed data and/or corresponding components) for use in performing data decomposition. As such, a data set associated with a window size can be provided to the trend identifier 1818 to determine or extract trend in association with a data point being decomposed. A window size can be defined in any number of ways. In one example, a window size may be a multiple (e.g., four times) of a seasonality parameter. Such seasonality parameter may be defined by a user. For example, a user may provide a seasonality parameter of three to indicate seasonality associated with a time series. In such a case, a window size may be 12 data points (i.e., four times seasonality of three) for use in determining a trend. In cases in which multiple seasonality parameters are provided to determine multiple seasonal components, one of the seasonality parameters may be selected for use in determining a window size. For example, a largest or a maximum seasonality parameter may be selected for use in determining a window size (e.g., a maximum seasonality parameter multiplied by four). By way of example only, assume two seasonality parameters 48 and 336 are input by a user. In such a case, the seasonality parameter of 336 may be selected and used to determine a window size. Alternatively, as multiple iterations are performed to determine multiple seasonality parameters, in some cases, the different seasonality parameters may be used to determine different window sizes. For instance, assume again that seasonality parameters of 48 and 336 are provided by a user. In such a case, the seasonality parameter of 48 may be used to determine a window size (e.g., 4 times 48) for determining a first seasonal component, and the seasonality parameter of 336 may be used to determine a window size (e.g., 4 times 336) for determining a second seasonal component. Utilizing a limited number of data points and/or corresponding components to determine trend enables a more resource efficient trend determination as each data point, and/or corresponding components, in a time series data set need not be used to determine trend.

As can be appreciated, and as described in more detail below, the trend identifier 1818 can be used to determine trend in an iterative or recursive manner. In this regard, an initial trend may be determined in association with an incoming data point. Thereafter, an intermediate trend (or seasonal trend) may be determined in association with a seasonal component, and a final trend may be determined in association with deseasoned data. In some cases, the window size of data used for performing each trend iteration may vary. For example, the window size may be reduced in size for each iteration of estimating trend. To this end, as the trend estimates become more refined in each iteration, the window size to use for trend determination can be reduced while maintaining accuracy. Stated differently, as each iterative trend estimate includes a smaller amount of noise, fewer amounts of data can be analyzed to reliably determine trend and, as such, the window size can be reduced for each iteration of trend analysis. The trend identified via a last iteration of the trend identifier 1818 can be the trend component determined for a data point being decomposed.

The seasonal identifier 1820 is generally configured to identify or determine seasonal(s) components. In particular, the seasonal identifier 1820 can determine seasonal component(s) (e.g., initial seasonal component and/or final seasonal component) for a particular data point (e.g., an incoming data point). The seasonal identifier 1820 can be implemented to determine a seasonal component(s) in a number of ways. Examples of determining a seasonal component(s) for a data point include utilization of a simple averages method, ratio to trend method, ratio-to-moving-average method, and link relatives method. In one embodiment, an exponential moving average may be used to emphasize more recent data. In this regard, a weighted average for previously identified seasonal components (e.g., a prior seasonal estimate associated with data points within a defined window size or with data points previously analyzed) may be used to determine a seasonal component for a current data point (e.g., incoming data point). By way of example only, assuming trend is removed from an incoming data point, resulting in detrended data containing seasonality. In such a case, the seasonal identifier 1820 can apply a first weight (e.g., 0.3) to an average of seasonal components identified for previous data points (e.g., corresponding with a window size or previously analyzed) and a second weight (e.g., 0.7) to the detrended data containing seasonality. The first and second weights applied can be determined or designated in any manner. For instance, a default weight value may be applied for seasonal components associated with previous data points (prior seasonal component estimate) while another default weight value may be applied for a seasonal component associated with a current data point. The weight applied to the previously identified seasonal components may be less than the weight applied to the seasonal component associated with a current data point to reduce deviation from the current seasonal component.

Advantageously, and in accordance with embodiments described herein, seasonal components can be determined using a number of data points (and/or corresponding components) that correspond with a defined window size. As such, in some cases, a data set associated with a window size can be provided to the seasonal identifier 1820 to determine or extract a seasonal component in association with a data point. In other cases, previously determined seasonal components estimated in association with previous data points (e.g., within a defined window size or any number of previously analyzed) may be accessed and used by the seasonal identifier 1820 to determine a seasonal component in association with a particular data point. A window size can be defined in any number of ways. In one example, a window size may be four times a seasonality parameter. Such seasonality parameter may be defined by a user. For example, a user may provide a seasonality parameter of three. In such a case, a window size is 12 data points for use in determining seasonal components. In cases in which multiple seasonality parameters are provided to determine multiple seasonal components, one of the seasonality parameters may be selected for use in determining a window size. For example, a largest or a maximum seasonality parameter may be selected for use in determining a window size (e.g., a maximum seasonality parameter multiplied by four). By way of example only, assume two seasonality parameters 48 and 336 are input by a user. In such a case, the seasonality parameter of 336 may be selected and used to determine a window size. Alternatively, as multiple iterations are performed to determine multiple seasonality parameters, in some cases, the different seasonality parameters may be used to determine different window sizes. For instance, assume again that seasonality parameters of 48 and 336 are provided by a user. In such a case, the seasonality parameter of 48 may be used to determine a window size (e.g., 4 times 48) for a first iteration of determining a seasonal component, and the seasonality parameter of 336 may be used to determine a window size (e.g., 4 times 336) for a second iteration of determining a seasonal component. Utilizing a limited number of data points to determine seasonal components enables a more resource efficient seasonal components determination as each data point in a time series data set need not be used to determine seasonal components.

As can be appreciated, and as described in more detail below, the seasonal identifier 1820 can be used to determine seasonal components in an iterative manner. In this regard, an initial seasonal component may be determined in association with a first set of detrended data (e.g., a first iteration of identified trend removed from data). Thereafter, a final seasonal component may be determined in association with a second set of detrended data (e.g., a first iteration and second iteration of identified trend removed from data). In some cases, the window size used for performing each seasonal component iteration may vary. For example, the window size may be reduced in size for each iteration. To this end, as the seasonal component estimates become more refined in each iteration, the window size to use for seasonal components determination can be reduced while maintaining accuracy. Stated differently, as each iterative seasonal component estimate includes a smaller amount of noise, fewer data points and/or corresponding components can be analyzed to reliably determine seasonal component and, as such, the window size can be reduced for each iteration of seasonal component analysis. The seasonal component identified via a last iteration of the seasonal identifier 1820 can be the seasonal component (e.g., final seasonal component) determined for a data point being decomposed.

Although some embodiments described herein include using previously determined seasonal component(s) associated with previous data points within a defined window size (e.g., x times a maximum seasonality parameter) to determine a seasonal component in association with a particular data point, any number of previously determined seasonal components may be used. In this regard, for example, a running average of all previously corresponding seasonal components associated with data points in a time series may be maintained and used. As can be appreciated, such a running average can be efficiently indexed and updated to efficiently access previous seasonal components and determine a current seasonal component.

By way of example only, assume a seasonality parameter is 10 and an incoming data point corresponds with a period or timestamp of 115. In such a case, the data point of 115 corresponds to a fifth element in a period of 10. An index associated with the fifth element can be accessed to identify a running average of seasonal components of previous analyzed data points associated with the fifth element, such as seasonal components associated with data points corresponding with points 5, 15, 25, 35, 45, etc. The indexed seasonal components estimate may be used to determine a seasonal component for the incoming data point. Upon determining a seasonal component associated with the incoming data point, the index can be updated to include the new seasonal components (e.g., either in addition to previous seasonal components or to replace/update a seasonal components estimate representation).

A residual identifier 1822 is generally configured to identify or determine a residual or remainder. The residual identifier 1822 can generally determine a residual for a data point by removing trend and seasonal component(s) from the data to arrive at a residual component. In this regard, the residual identifier can remove a final trend (e.g., identified via trend identifier 1818) and a final seasonal component or multiple seasonal component (e.g., identified via seasonal identifier 1820) to obtain a residual component for a data point.

As described, various embodiments described herein advantageously use a particular window size of data for analysis. A window size for use in performing data decomposition may be based on a seasonality parameter, for example, input or designated by a user. A seasonality parameter generally refers to an indication of seasonality associated with a set of data (e.g., a time series data set). Seasonality may be designated in any number of ways, such as dates/time, number of data points, or the like. For example, seasonality may be indicated by a month or one thousand data points. Further, as described herein, multiple seasonality parameters may be provided to obtain multiple seasonal components. In some implementations, one of the seasonal components may be selected for use in determining the window size.

In addition to a window size being used to identify data points and/or corresponding components for performing data decomposition, a window size may also be used to define the number of data points, and/or components associated therewith, stored in the data store 1816. As one example, assume a window size is defined as four times a seasonality parameter. Further assume a user inputs a seasonality parameter of three. In such a case, the last twelve data points, and corresponding components, can be stored in the data store 1816. In this way, a buffer or cache of four times a seasonality parameter can be maintained for utilization in performing data decomposition. As another example, assume a user inputs a seasonality parameters of 48 and 336. In such a case, the greater seasonality parameter of 336 may be used to determine the number of data points, and corresponding components, to store in the data store.

The decomposition manager 1812 can perform an iterative or recursive approach to more accurately identify data components, including trend, seasonal, and residual components. In each iteration of decomposing to identify a particular component (e.g., trend), less data may be analyzed to perform data decomposition. For example, assume a window size associated with a first iteration to identify trend is four times a seasonality parameter. In a second iteration to identify trend, a window size may be three times the seasonality parameter, and in a third iteration to identify trend, a window size may be one times the seasonality parameter, or simply the seasonality parameter. As can be appreciated, the window size may be any multiple, or other derivation, associated with a seasonality parameter or otherwise. Although specific examples are provided herein (e.g., four times a seasonality parameter), embodiments are not intended to be limited thereto.

In embodiments in which multiple seasonal components are determined, an iterative approach, or portion thereof, to identify data components may be performed multiple times corresponding with the multiple seasonalities. In this regard, at least a portion of the iterative approach may be performed for each seasonality determination. Each seasonality determination may then be used to identify a final trend and residual, as described in more detail below.

An iterative approach for performing data decomposition can be performed in any of a number of ways. Generally, and at a high level, various iterations are used to identify a data component(s), such as trend and seasonal components, for a data point. In traversing through various decomposition iterations, noise can be progressively removed to enable more accurate identification of data components. One example of an iterative decomposition approach is described herein in accordance with various embodiments, but is not intended to be limiting. In one iterative approach, decomposition manager 1812 can initially obtain a set of data points. The set of data points can include a data point, or target data point, (e.g., incoming data point) for which data decomposition is desired. The set of data points may also include other observed data points to be used to perform data decomposition (e.g., data points received before an incoming data point). In embodiments, the set of data points obtained includes an amount corresponding with a defined window size. For example, assume a window size is 12 data points (e.g., four times a seasonality parameter of three). In such a case, 12 data points can be obtained, for instance, via data store 1816 (e.g., a cache containing 12 data points). In some embodiments, the 12 data points may include a target data point (e.g., incoming data point) for which data decomposition is desired. In other embodiments, the 12 data points may exclude the target data point (e.g., incoming data point) such that the obtained set of data points includes 13 data points (e.g., a target data point for which data decomposition is desired and 12 additional data points for use in performing data decomposition). As described herein, in instances in which multiple seasonal components determinations are being determined, a window size of data points to obtain may be based on one of the seasonality parameters provided (e.g., by a user). For example, a greatest or largest of the seasonality parameters may be selected as a seasonality parameter to use in determining an appropriate window size.

As can be appreciated, the decomposition manager 1812 may obtain a set of data points in any of a number of ways. As one example, the decomposition manager 1812 may receive a set of data points via a data manager 1812. As another example, the decomposition manager 1812 may retrieve a set of data points via a data store, such as data store 1816. The data points may be obtained by the decomposition manager 1812 in a streaming manner or as a group of data.

Upon obtaining a set of data points, including a target data point for which decomposition is desired, an initial trend may be determined for the target data point (e.g., an incoming data point). An initial trend may be determined using various techniques, such as kernel smoothing, moving averages, or the like. In one example, an initial trend may be determined using a trend identifier that performs kernel smoothing. Kernel smoothing can be applied in association with a data set associated with a defined window size. In some cases, a window size used to identify an initial trend associated with a target data point may be four times a seasonality parameter. As such, if a seasonality parameter (e.g., input by a user) is three, the window size is 12 data points being analyzed to identify trend of a target or incoming data point. Such smoothing (e.g., kernel smoothing) can generally smooth out seasonality and noise and bring out the trend.

The identified initial trend is extracted or removed from the target data point (e.g., incoming data point) to generate a detrended data point. A detrended data point, as used herein, generally refers to a data point with the initial trend removed. In embodiments, depending on whether a data set composition is multiplicative or additive, the initial trend component may be divided or subtracted, respectively, from the original data point, or observed data, to remove the trend.

As can be appreciated, the detrended target data point generally includes seasonal and residual or noise components. As such, upon detrending the target data point, an initial seasonal component for the target data point can be determined. A seasonal component can be determined in various manners including, for example, a weighted average of seasonal components. As one example, to determine an initial seasonal component for the target data point, the detrended target data point can correspond with a first weight and other (e.g., previous) initial seasonal components associated with the defined window size can correspond with a second weight (e.g., smaller weight than the first weight). As an initial seasonal component for a detrended target data point can be determined based on initial seasonal components associated with other data points (e.g., prior data points), such initial seasonal components previously determined for detrended data points can be accessed (e.g., from a data store) and used to determine a seasonal component corresponding with the target data point. For example, initial seasonal components associated with the window size may be accessed and used to determine an initial seasonal component for the detrended target data point. In other cases, a prior seasonal component estimate that represents initial seasonal components (e.g., within the window size or any prior analyzed data point) can be accessed and used to determine a seasonal component for the target data point. In some cases, the prior seasonal component(s) estimate may be updated in accordance with the newly determined seasonal component for the target data point and stored for subsequent use (e.g., via an index). In this regard, a prior seasonal component estimate may be updated to incorporate the newly determined seasonal component and stored. Thereafter, upon obtaining a new data point, the updated prior seasonal component estimate can be used to update the detrended new target data point to generate an initial seasonal component for the new data point.

As the initial seasonal component may maintain some trend, an intermediate or seasonal trend may be determined for the target data point. An intermediate trend, or seasonal trend, generally refers to a trend determined based on an initial seasonal component. In this regard, a trend filter may be applied to identify trend of the initial seasonal component. An intermediate trend may be determined using various techniques, such as kernel smoothing, moving averages, or the like. In one example, an intermediate trend may be determined using a trend identifier that performs kernel smoothing. Kernel smoothing can be applied in association with a data set of a defined window size. In some cases, a window size used to identify an intermediate trend associated with a target data point may be three times a seasonality parameter. As such, if a seasonality parameter (e.g., input by a user) is three, the window size is nine data points and/or corresponding components being analyzed to identify intermediate trend associated with a target data point. In this example, a data store (e.g., data store 1816) may be accessed to use the initial seasonal components for the previous nine data points to identify an intermediate trend of seasonality for the target data point.

The identified intermediate trend can be extracted or removed from the detrended target data point to generate an augmented detrended data point. An augmented detrended data point, as used herein, generally refers to a data point with the initial trend and the intermediate trend removed. In this regard, the initial trend and intermediate trend are removed from the original target data point. To extract the initial and/or intermediate trend component, in embodiments, depending on whether the data set composition is multiplicative or additive, the initial and/or intermediate trend component may be divided or subtracted, respectively, from the original data point, or observed data.

Upon generating an augmented detrended data point, a final seasonal component for the target data point can be determined. Seasonal components can be determined in various manners including, for example, a weighted average of seasonal components. As one example, to determine a final seasonal component for the target data point, the augmented detrended target point can correspond with a first weight and other (e.g., previous) final seasonal components (e.g., associated with a defined window size or any number of previous seasonal components) can correspond with a second weight (e.g., smaller weight than the first weight). As a final seasonal component for an augmented detrended target data point can be determined based on final seasonal components associated with other data points (e.g., prior data points), such final seasonal components previously determined can be accessed (e.g., from a data store) and used to determine the final seasonal component corresponding with the target data point. For example, final seasonal components associated with the window size may be accessed and used to determine a final seasonal component for the augmented detrended target data point. In other cases, a prior seasonal component estimate that represents final seasonal components (e.g., all previously determined) can be accessed and used to determining final seasonal component for the target data point. The prior seasonal component estimate may represent the set of final seasonal components within the window size or represent any number of prior final seasonal components (e.g., running average over all corresponding previous data points). In such cases, the prior seasonal component estimate may be updated in accordance with the newly determined final seasonal component for the target data point and stored for subsequent use. In this regard, a prior seasonal component estimate may be updated to incorporate the newly determined final seasonal component and stored (e.g., via an index). Thereafter, upon obtaining a new data point, the updated prior seasonal component estimate can be used to update the augmented detrended new target data point to generate a final seasonal component for the new data point.

The final seasonal component for the target data point can be removed or extracted from the original target data point to generate a deseasoned target data point. A deseasoned data point generally refers to a data point having final seasonal component(s) removed.

In cases in which multiple seasonal components are being determined, the deseasoned target data point associated with a particular seasonal component (e.g., a first seasonal component removed) can be used to identify a subsequent seasonal component (e.g., a second seasonal component). In this regard, the deseasoned target data point can be provided for use in determining an initial trend, and the iterative process can continue to determine another final seasonal component associated with another seasonality parameter. This process of determining final seasonal components can continue until a final seasonal component is determined for each desired seasonality parameter. For example, assume a user inputs two seasonality parameters of 48 and 336. In such a case, the iterative process of determining an initial trend through removing a final seasonal component can be executed two times, one for each seasonality parameter. In some implementations, the seasonal component determinations may be performed in an increasing or decreasing order. For example, a first iterative process to determine a first final seasonal component may be applied in association with the smallest seasonality parameter, the second iterative process to determine a second final seasonal component may be applied in association with the second smallest seasonality parameter, and so on.

Upon removing a final seasonal component, or multiple final seasonal components in cases in which multiple seasonal components are determined, a final trend can be determined for the deseasoned target data point. A final trend generally refers to a trend determined based on a deseasoned target data point. In this regard, a trend filter may be applied to identify trend of the deseasoned target data point. A final trend may be determined using various techniques, such as kernel smoothing, moving averages, or the like. In one example, a final trend may be determined using a trend identifier that performs kernel smoothing. Kernel smoothing can be applied in association with a data set of a defined window size. In some cases, a window size used to identify a final trend associated with a target data point may be one times seasonality parameter, or simply the seasonality parameter. As such, if a seasonality parameter (e.g., input by a user) is three, the window size is three data points and/or corresponding components being analyzed to identify a final trend component associated with a target data point. In this example, a data store (e.g., data store 1816) may be accessed to use the deseasoned data point for the previous three data points to identify a final trend for the target data point.

Upon determining a final seasonal component, or multiple seasonal components, and a final trend for the target data point, the residual component can be determined. In embodiments, the residual component is determined by removing the final seasonal component, or multiple seasonal components, and the final trend component from the target data point. Such a final seasonal component(s), a final trend component, and a residual component can be provided for use in analyzing the data set, as further described herein. In cases in which multiple seasonal components are determined, multiple seasonal components can be output along with a trend and residual component. For instance, assume three seasonal components are determined. In such a case, a first seasonal component, a second seasonal component, a third seasonal component, a trend component, and a residual component may be provided as output for presentation and/or further data analysis.

As can be appreciated, any number of iterations of determining data components (e.g., trend and seasonal components) can be applied. In the above example implementation, an initial, intermediate, and final trend are determined as well as an initial and final seasonal component. Fewer or more iterations, however, are contemplated within the scope of embodiments herein. For example, multiple intermediate trend components may be identified and used to identify a final trend component for a target data point. Further, the iterative process, or portion thereof, can be implemented any number of times to determine various seasonal components associated with the data.

As described, the decomposition manager 1812 may perform data decomposition in a batch mode and/or an online mode. Advantageously, in performing online data decomposition, a data point can be analyzed and decomposed into components as it is obtained thereby resulting in more accurate and more efficient data decomposition. In online mode, each data point can be decomposed into components using a trend identifier, a seasonal identifier, and/or a residual identifier, as described above. In embodiments, an iterative process is implemented to identify trend, seasonal(s), and/or residual components for an incoming data point. For example, and as described above, an initial, intermediate, and final trend may be determined as well as an initial and final seasonal component(s). The final trend and seasonal components can be used determine the residual component.

With online decomposition, as a new data point arrives, the decomposition manager 1812 manages decomposition of the data point to trend, seasonal, and residual components. As described, such components can be determined using a portion of a set of data points. For example, data decomposition may be performed based on a predetermined number (e.g., window size) of previous data points and/or corresponding components. With the initial incoming data points, however, previous data points and/or corresponding components may not exist or may be limited in number. As such, data decomposition may be difficult to accurately perform with no or limited number of previous data points.

Accordingly, to determine data components associated with initial incoming data points in an online manner, the decomposition manager 1812 may utilize an alternative online approach to accommodate for the absence of data. In one example, in performing online decomposition for initial incoming data (e.g., within a defined window size), the seasonal component may be assumed to be zero. As a more accurate seasonal component may be difficult to determine until a particular number of data points and/or corresponding components can be analyzed (e.g., within a defined window size), an assumption of a default seasonal component, such as zero, can be used. For instance, until a window size of initial data points, such as four times a seasonality parameter, can be analyzed, seasonal components can be assumed to be zero.

To determine a trend component for initial incoming data points in an online manner, the decomposition manage 1812 may utilize exponential moving average to determine the trend component. As seasonal component may be assumed to be zero for these initial data points, the trend (e.g., determined via exponential moving average) can be removed from the data point to determine a residual component. This is only one example implementation for determining trend, seasonal(s), and residual components in an online manner prior to obtaining a particular number of data points (e.g., less than a determined or defined window size of data points). As can be appreciated, upon obtaining and/or analyzing a particular number of data points (e.g., window size of initial data points), the decomposition manager 1812 can transition to an iterative approach (e.g., as described above) in determining data components for incoming data points in an online manner (e.g., using a previous set of data points and/or corresponding components).

In accordance with embodiments described herein, to perform online decomposition, the decomposition manager 1812 may initially implement a batch decomposition process. A batch decomposition process generally refers to decomposing a batch or set of data points as a set. As previous described, with the initial incoming data points, previous data points and/or corresponding components may not exist or may be limited in number. As such, data decomposition may be difficult to perform with no or limited number of previous data points.

Accordingly, the decomposition manager 1812 may perform a batch decomposition process to facilitate data decomposition for such initial incoming data points. Such a batch decomposition process may be performed for a data point in combination with the alternative online decomposition process described above in relation to the initial incoming data points. As such, when initial incoming data points are obtained, an online decomposition processing may be performed to determine and output data components and batch decomposition processing may also be performed in connection with the data point. Such batch processing is particularly advantageous to identify or understand seasonal components. As described above, a seasonal component for a data point can be determined using seasonal components determined for previous data points. Seasonal components, however, are difficult to determine until at least a season of data is collected (e.g., a window size of data). Further, performing online data decomposition for an initial set of data points can result in an assumption of a seasonal component of 0. As such, estimating seasonal components using a batch decomposition process can facilitate identifying seasonal components for initial incoming data points, which can facilitate determining seasonal components for subsequent data points in an online manner.

Generally, a batch decomposition process is performed upon collection of an initial batch set of data points. In embodiments, the initial batch set of data points may be defined or predetermined. In some cases, the initial set of data points for batch processing may correspond with a window size used for determining data components (e.g., window size of four times seasonality parameter). As such, to perform batch processing, the decomposition manager 1812 can wait until the initial set of data points (e.g., four times seasonality parameter) are obtained, for example, in data store 1816. Upon obtaining the initial set of data points, batch processing can be performed.

Batch data decomposition can be performed for each data point in the initial set of data points. For example, data decomposition can be performed in a sequential manner for each data point beginning with the first data point in a time series data set. For batch processing, future data points within the batch set of data have been obtained and can be used to facilitate determination of a data component(s). For example, assume a first data point, of an initial batch set of twelve data points, is being decomposed. In such a case, the second through twelfth data points can be analyzed and used to determine a trend for the first data point. Similarly, for seasonal components, the seasonal components of the other data points in the batch set can be analyzed and used to determine a seasonal component for a particular data point.

In performing batch mode data decomposition, data decomposition may be performed in an iterative process to determine components. For example, an iterative approach as described above may be employed in batch processing mode to determine trend, seasonal(s), and/or residual components. In this regard, an initial, intermediate, and final trend as well as an initial and final seasonal component may be determined via an iterative approach. In cases in which multiple seasonal components are being determined, an iterative approach, or portion thereof, can be executed for each seasonal component, as described above with regard to the online approach. Other approaches may alternatively be performed to determine data components in batch processing mode.

Upon performing batch processing, the decomposition manager 1812 can perform data composition in an online manner as each data point is obtained. In this way, the decomposition manager 1812 can utilize the data components (e.g., trend and/or seasonal(s)) determined via batch processing mode to determine data components for incoming data points in an online manner. As such, the data components determined via batch decomposition may be stored, for example in data store 1816, and accessed for decomposing subsequent data points in an online manner. In some cases, the data components, or portion thereof, determined for the initial set of data points via batch processing mode may replace the corresponding components determined via online data processing. For example, as described above, assume a first data point has been decomposed via online data decomposition (e.g., seasonal component is zero) and a first data point has been decomposed via batch processing. In such a case, one or more of stored data components determined via online processing may be updated or replaced with one or more data components determined via batch processing. For instance, a zero seasonal component assumed during online processing for a data point may be replaced with a seasonal component determined for that data point during batch processing.

Turning to a data provider 1814, the data provider 1814 is generally configured to provide identified data components for a data point for data analysis. As such, data points and/or corresponding data components can be provided in a streaming manner as the data components are identified. In embodiments, the data points and/or corresponding data components may be provided for display to a user, for example, via a user device. Such data may be presented in any number of ways including data values, charts, graphs, etc. For example, various data components, including multiple seasonal components, may be provided in a graphical manner, via a graphical user interface. For example, with reference to FIG. 24, an original data set 2402, a trend component 2404, seasonal components 2406 and 2408, and residual component 2410 may be presented for display. Alternatively or additionally, the data points and/or corresponding data components may be provided to a data analysis service for performing data analysis.

Data analysis may be performed in any number of ways. Some examples of data analysis that may be performed using data points and/or data components are described herein, but not intended to be limited in any way. One example of data analysis includes anomaly detection. For example, a residual component(s) can be analyzed to identify anomalies in a data set. Another example of data analysis that may be performed includes drift detection. Yet another example of data analysis that may be performed includes variances in trend and/or frequency associated with a data set.

Such data analysis services may be performed at any time. For example, some data analysis services that may use data points and/or corresponding data components may perform data analysis (e.g., anomaly detection) in a preprocessing manner as data is being streamed. Additionally or alternatively, a data analysis service may utilize data points and/or corresponding data components to perform data analysis in accordance with a search (e.g., to detect anomalies).

In addition to providing data points and/or corresponding data components to a data analysis service, such data may be stored or added to a buffer for subsequent use. In some cases, the data components at each iteration may be stored for subsequent use. For instance, an initial, intermediate, and final trend may be stored as well as an initial and final seasonal component.

3.2 Overview of a Data Decomposition Engine in a Data Processing Environment

Figure 19:
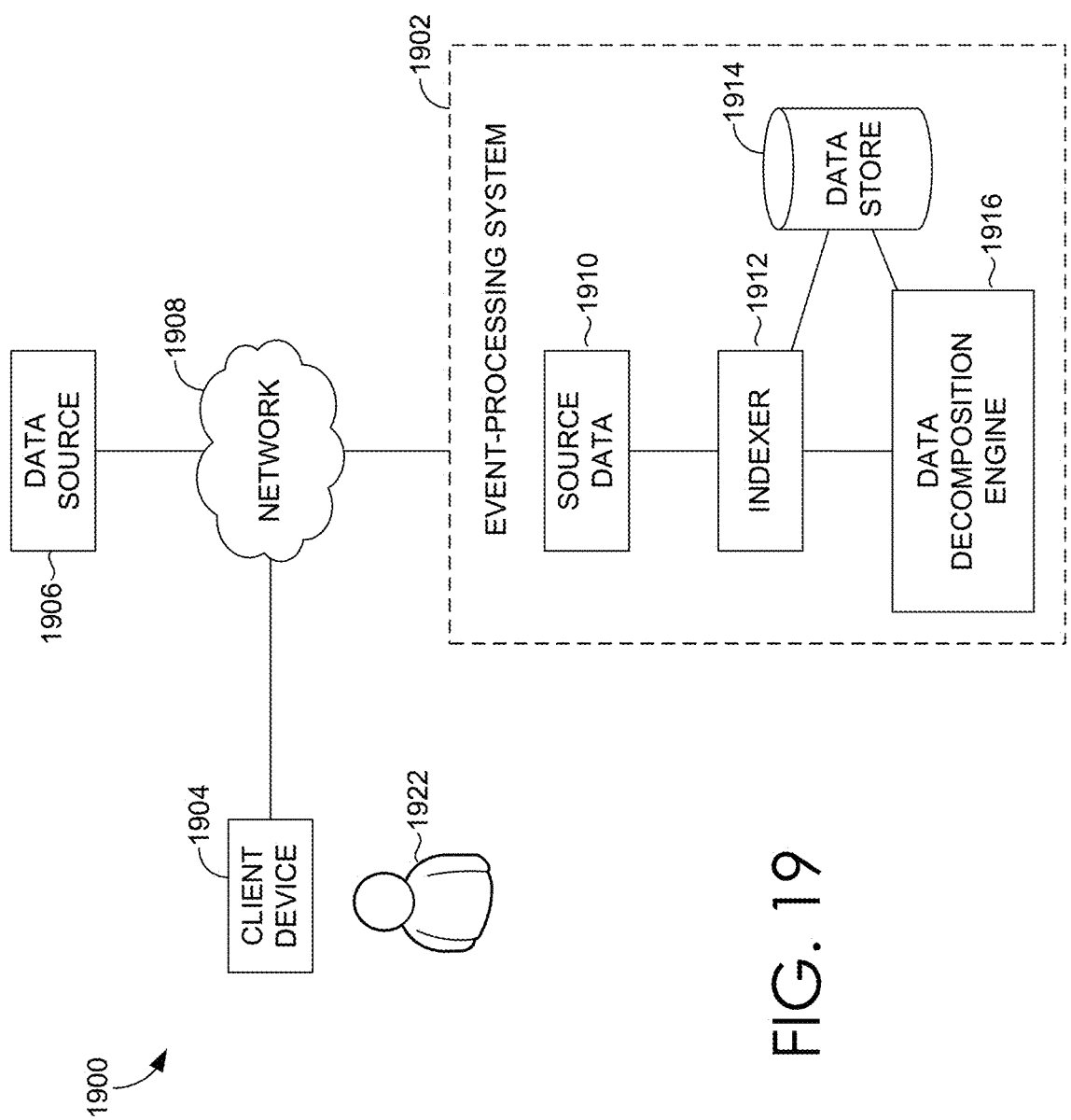
FIG. 19 depicts a block diagram of an illustrative data processing environment in accordance with various embodiments of the present disclosure.

FIG. 19 illustrates an example data processing environment 1900 in accordance with various embodiments of the present disclosure. Generally, the data processing environment 1900 refers to an environment that provides for, or enables, the management, storage, and retrieval of data. As shown in FIG. 19, the data processing environment includes a data decomposition engine 1916 used to decompose data. The data decomposition engine 1916 can perform data decomposition on data in an online manner. As described herein, data decomposition engine 1916 can facilitate data decomposition in an online manner resulting in an efficient and accurate process. Decomposing data in an online manner, as described herein, reduces resource usage by, among other things, utilizing a portion of previous data points to decompose an incoming data point. Further, the incoming data point is generally decomposed one time to generate trend, seasonal, and residual components and, thereafter, efficiently output for subsequent data analysis.

In some embodiments, the environment 1900 can include an event-processing system 1902 communicatively coupled to one or more client devices 1904 and one or more data sources 1906 via a communications network 1908. The network 1908 may include an element or system that facilitates communication between the entities of the environment 1900. The network 1908 may include an electronic communications network, such as the Internet, a local area network (LAN), a wide area network (WAN), a wireless local area network (WLAN), a cellular communications network, and/or the like. In some embodiments, the network 1908 can include a wired or a wireless network. In some embodiments, the network 1908 can include a single network or a combination of networks.

The data source 1906 may be a source of incoming source data 1910 being fed into the event-processing system 1902. A data source 1906 can be or include one or more external data sources, such as web servers, application servers, databases, firewalls, routers, operating systems, and software applications that execute on computer systems, mobile devices, sensors, and/or the like. Data source 1906 may be located remote from the event-processing system 1902. For example, a data source 1906 may be defined on an agent computer operating remote from the event-processing system 1902, such as on-site at a customer's location, that transmits source data 1910 to event-processing system 1902 via a communications network (e.g., network 1908).

Source data 1910 can be a stream or set of data fed to an entity of the event-processing system 1902, such as a forwarder (not shown) or an indexer 1912. In some embodiments, the source data 1910 can be heterogeneous machine-generated data received from various data sources 1906, such as servers, databases, applications, networks, and/or the like. Source data 1910 may include, for example raw data (e.g., raw time-series data), such as server log files, activity log files, configuration files, messages, network packet data, performance measurements, sensor measurements, and/or the like. For example, source data 1910 may include log data generated by a server during the normal course of operation (e.g. server log data). In some embodiments, the source data 1910 may be minimally processed to generate minimally processed source data. For example, the source data 1910 may be received from a data source 1906, such as a server. The source data 1910 may then be subjected to a small amount of processing to break the data into events. As discussed, an event generally refers to a portion, or a segment of the data, that is associated with a time. And, the resulting events may be indexed (e.g., stored in a raw data file associated with an index file). In some embodiments, indexing the source data 1910 may include additional processing, such as compression, replication, and/or the like.

As can be appreciated, source data 1910 might be structured data or unstructured data. Structured data has a predefined format, wherein specific data items with specific data formats reside at predefined locations in the data. For example, data contained in relational databases and spreadsheets may be structured data sets. In contrast, unstructured data does not have a predefined format. This means that unstructured data can comprise various data items having different data types that can reside at different locations.

The indexer 1912 of the event-processing system 1902 receives the source data 1910, for example, from a forwarder (not shown) or the data source 1906, and apportions the source data 1910 into events. An indexer 1912 may be an entity of the event-processing system 1902 that indexes data, transforming source data 1910 into events and placing the results into a data store 1914, or index. Indexer 1912 may also search data stores 1914 in response to requests or queries. An indexer 1912 may perform other functions, such as data input and search management. In some cases, forwarders (not shown) handle data input, and forward the source data 1910 to the indexers 1912 for indexing.

During indexing, and at a high-level, the indexer 1912 can facilitate taking data from its origin in sources, such as log files and network feeds, to its transformation into searchable events that encapsulate valuable knowledge. The indexer 1912 may acquire a raw data stream (e.g., source data 1910) from its source (e.g., data source 1906), break it into blocks (e.g., 64K blocks of data), and/or annotate each block with metadata keys. After the data has been input, the data can be parsed. This can include, for example, identifying event boundaries, identifying event timestamps (or creating them if they don't exist), masking sensitive event data (such as credit card or social security numbers), applying custom metadata to incoming events, and/or the like. Accordingly, the raw data may be data broken into individual events. The parsed data (also referred to as "events") may be written to a data store, such as an index or data store 1914.

The data store 1914 may include a medium for the storage of data thereon. For example, data store 1914 may include non-transitory computer-readable medium storing data thereon that is accessible by entities of the environment 1900, such as the corresponding indexer 1912 and the data decomposition engine 1916. As can be appreciated, the data store 1914 may store the data (e.g., events) in any manner. In some implementations, the data may include one or more indexes including one or more buckets, and the buckets may include an index file and/or raw data file (e.g., including parsed, time-stamped events). In some embodiments, each data store is managed by a given indexer that stores data to the data store and/or performs searches of the data stored on the data store. Although certain embodiments are described with regard to a single data store 1914 for purposes of illustration, embodiments may include employing multiple data stores 1914, such as a plurality of distributed data stores 1914.

As described, events within the data store 1914 may be represented by a data structure that is associated with a certain point in time and includes a portion of raw machine data (e.g., a portion of machine-generated data that has not been manipulated). An event may include, for example, a line of data that includes a time reference (e.g., a timestamp), and one or more other values. In the context of server log data, for example, an event may correspond to a log entry for a client request and include the following values: (a) a time value (e.g., including a value for the data and time of the request, such as a timestamp), and (b) a series of other values including, for example, a page value (e.g., including a value representing the page requested), an IP (Internet Protocol) value (e.g., including a value for representing the client IP address associated with the request), and an HTTP (Hypertext Transfer protocol) code value (e.g., including a value representative of an HTTP status code), and/or the like. That is, each event may be associated with one or more values. Some events may be associated with default values, such as a host value, a source value, a source type value and/or a time value. A default value may be common to some of all events of a set of source data.

In some embodiments, an event can be associated with one or more characteristics that are not represented by the data initially contained in the raw data, such as characteristics of the host, the source, and/or the source type associated with the event. In the context of server log data, for example, if an event corresponds to a log entry received from Server A, the host and the source of the event may be identified as Server A, and the source type may be determined to be "server." In some embodiments, values representative of the characteristics may be added to (or otherwise associated with) the event. In the context of server log data, for example, if an event is received from Server A, a host value (e.g., including a value representative of Server A), a source value (e.g., including a value representative of Server A), and a source type value (e.g., including a value representative of a "server") may be appended to (or otherwise associated with) the corresponding event.

In some embodiments, events can correspond to data that is generated on a regular basis and/or in response to the occurrence of a given event. In the context of server log data, for example, a server that logs activity every second may generate a log entry every second, and the log entries may be stored as corresponding events of the source data. Similarly, a server that logs data upon the occurrence of an error event may generate a log entry each time an error occurs, and the log entries may be stored as corresponding events of the source data.

In accordance with events being stored in the data store 1914, the data decomposition engine 1916 can function to decompose data points, for example, into trend, seasonal, and residual components. Although the data decomposition engine 1916 is illustrated and described herein as a separate component, this is for illustrative purposes. As can be appreciated, the data decomposition engine 1916, or functions described in association therewith, can be performed at the indexer 1912, a search head (not shown), or any other component. For example, some functionality described in association with the data decomposition engine 1916 might be performed at a search head, while other functionality described in association with the data decomposition engine 1916 might be performed at an indexer or at ingestion before indexing.

As described herein, a user of the client device 1904 may input a seasonality parameter for use in performing data decomposition. Further, data components, such as trend, variability, and/or residual may be provided to the client device, or other client device, for display to a user. In some cases, as described herein, the determined data components may be provided to a data analysis service to perform data analysis, such as anomaly detection. Results and/or alerts associated with such data analysis may then be provided to a client device, such as client device 1904.

The client device 1904 may be used or otherwise accessed by a user 1922, such as a system administrator or a customer. A client device 1904 may include any variety of electronic devices. In some embodiments, a client device 1904 can include a device capable of communicating information via the network 1908. A client device 1904 may include one or more computer devices, such as a desktop computer, a server, a laptop computer, a tablet computer, a wearable computer device, a personal digital assistant (PDA), a smart phone, and/or the like. In some embodiments, a client device 1904 may be a client of the event processing system 1902. In some embodiments, a client device 1904 can include various input/output (I/O) interfaces, such as a display (e.g., for displaying a graphical user interface (GUI), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 1904 can include general computing components and/or embedded systems optimized with specific components for performing specific tasks. In some embodiments, a client device 1904 can include programs/applications that can be used to generate a request for content, to provide content, to render content, and/or to send and/or receive requests to and/or from other devices via the network 1908. For example, a client device 1904 may include an Internet browser application that facilitates communication with the event-processing system 1902 via the network 1908. In some embodiments, a program, or application, of a client device 1904 can include program modules having program instructions that are executable by a computer system to perform some or all of the functionality described herein with regard to at least client device 1904. In some embodiments, a client device 1904 can include one or more computer systems similar to that of the computer system 2400 described below with regard to at least FIG. 24.

In some cases, data decomposition can be initiated or triggered at the client device 1904 via a search graphical user interface (GUI). In some embodiments, the event-processing system 1902 can provide for the display of a search GUI. Such a search GUI can be displayed on a client device 1904, and can present information relating to initiating data analysis (e.g., prediction analysis), performing data analysis, and viewing results of data analysis.

A data analysis, such as search analysis, can be initiated at a client device by a user at any time. In this regard, a user may initiate data analysis prior to or in accordance with performing a search for information. Although generally described herein as performing data analysis upon the events being created, indexed, and stored, data analysis can be defined and applied before or as events are created, indexed, and/or stored. Further, data analysis may be automatically triggered. For example, upon initially establishing a data analysis, subsequent data analyses may be automatically triggered and performed as new data is received.

In other cases, data decomposition can be automatically initiated or triggered as data is obtained (e.g., via a data streaming process). As described, such data decomposition may be performed upon events being created, indexed, and/or stored or, alternatively, before or as events are created, indexed, and/or stored.

The data decomposition engine 1916 is generally configured to facilitate data decomposition in an online manner. As described, data decomposition for an incoming data point can be performed in association with a previous set of obtained data points. Such a previous set of obtained data points to use in data decomposition may be defined via a window size based on a seasonality parameter. In this regard, a user may enter a seasonality parameter or a set of seasonality parameters, for example, via client device 1904 to specify seasonality(s) associated with the data set. In accordance with providing a seasonality parameter(s), a window size can be determined and utilized in performing data decomposition. As described herein, in cases in which multiple seasonality parameters are provided, a window size can be determined using one of the seasonality parameters (e.g., a greatest or maximum seasonality parameter). Although various parameters might be input by a user, as can be appreciated, in some implementations, any number of such parameters might be default parameters that are used.

As can be appreciated, in some cases, data initially stored in the data store 1914 might not be in a time series data format. For example, raw data stored in the data store 1914 may not be in a time series data format. In such a case, prior to performing data decomposition, the data can be converted to a time series data set. One example of converting a set of data into a time series data format includes using a timechart command, or other similar functionality. A timechart command, or other similar functionality, used to convert data into a time series data format can be applied automatically or based on a user selection.

3.3 Illustrative Data Decomposition Operations

Figure 21:
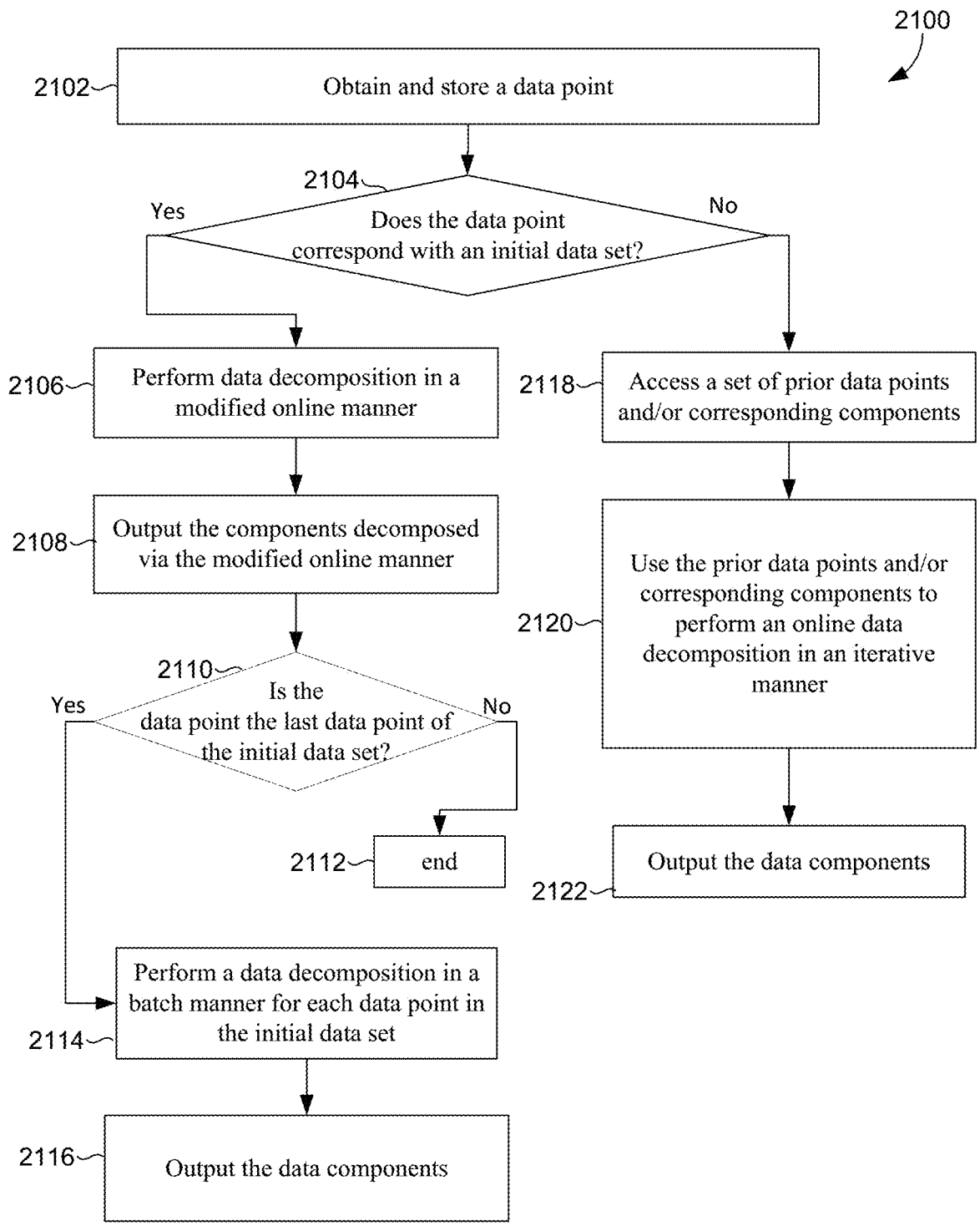
FIG. 21 is a flow diagram depicting a second illustrative method of performing data decomposition, according to embodiments of the present disclosure.
Figure 22:
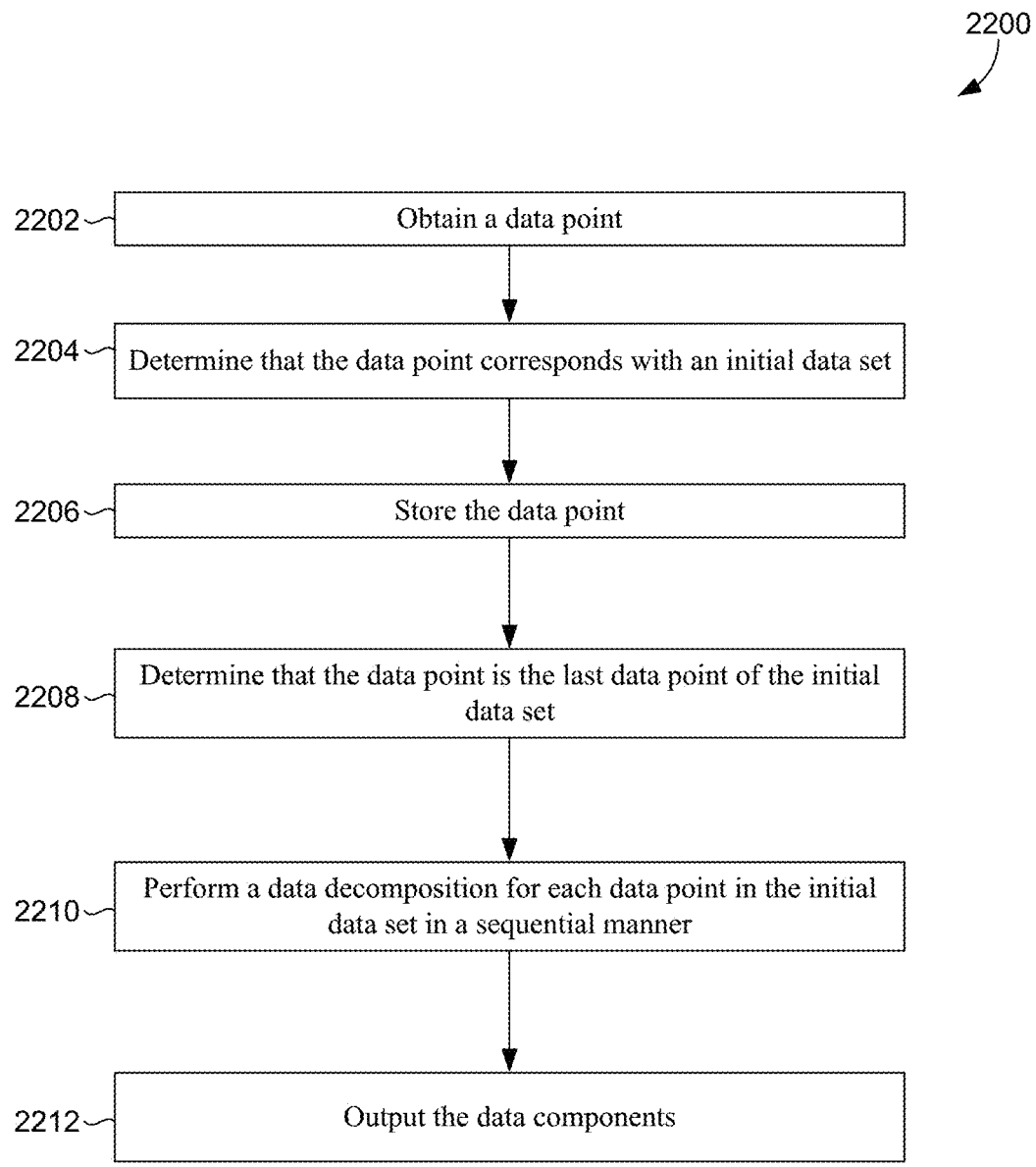
FIG. 22 is a flow diagram depicting a third illustrative method of performing data decomposition, in accordance with embodiments of the present disclosure.
Figure 23:
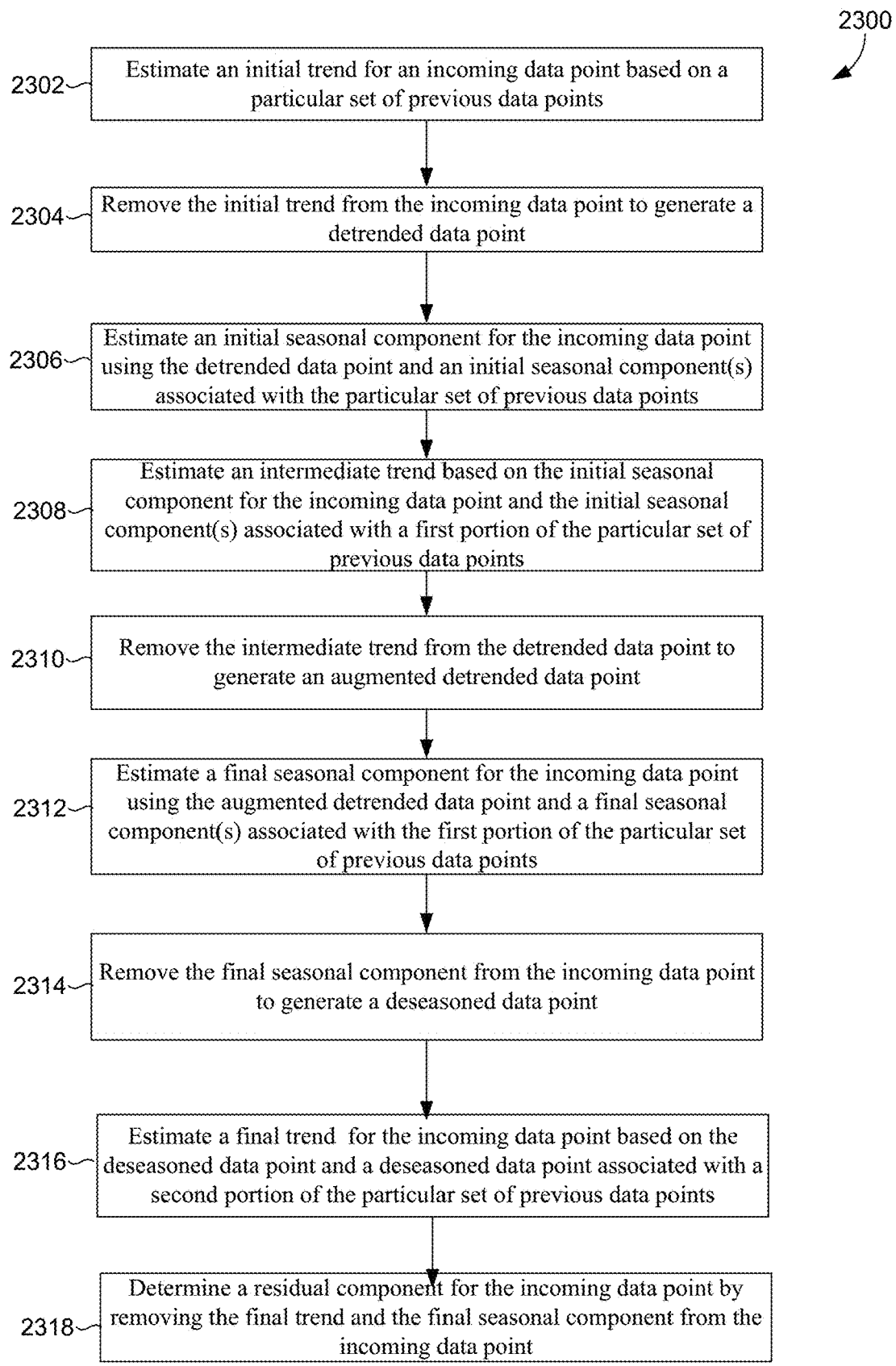
FIG. 23 is a flow diagram depicting a fourth illustrative method of performing data decomposition, in accordance with embodiments of the present disclosure.

FIGS. 20-23 illustrate various methods of performing data decomposition, in accordance with embodiments of the present technology. Although the method 2000 of FIG. 20, the method 2100 of FIG. 21, the method 2200 of FIG. 22, and the method 2300 of FIG. 23 are provided as separate methods, the methods, or aspects thereof, can be combined into a single method or combination of methods. As can be appreciated, additional or alternative steps may also be included in different embodiments. Such methods may be performed, for example, at a data decomposition engine, such as data decomposition engine 1800 of FIG. 18.

Figure 20:
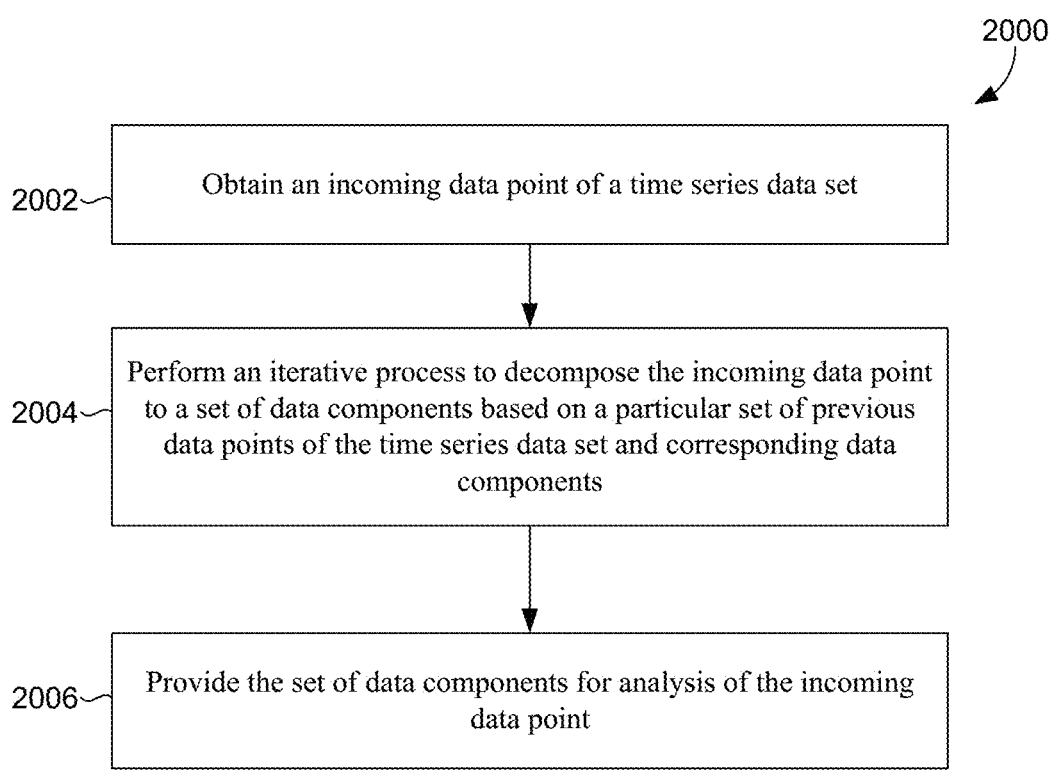
FIG. 20 is a flow diagram depicting a first illustrative method of performing data decomposition, according to embodiments of the present disclosure.

With initial reference to FIG. 20, FIG. 20 illustrates a first method 2000 used for performing data decomposition, in accordance with embodiments of the present technology. Initially, at block 2002, an incoming data point of a time series data set is obtained. An incoming data point may be streamed in real time as the data point is observed. At block 2004, an iterative process of estimating trend and seasonal components is performed to decompose the incoming data point to a set of data components based on a particular set of previous data points of the time series data set and corresponding data components. The particular set of previous data points and corresponding data components may be based on a multiple of a seasonality parameter (e.g., four times a seasonality parameter). In embodiments, the set of data components determined for the incoming data point comprises a trend component, a seasonal component, and a residual component. At block 2006, the set of data components is provided for analysis of the incoming data point. For example, the residual data component may be analyzed to detect a data anomaly. In some cases, the data components for an incoming data point is provided or output in real time such that a real time data analysis (e.g., anomaly detection) can be performed.

Turning now to FIG. 21, FIG. 21 illustrates a second method 2100 used for performing data decomposition, in accordance with embodiments of the present technology. Initially, at block 2102, a data point is obtained and stored. For example, an incoming data point may be obtained from a data source. At block 2104, a determination is made as to whether the data point corresponds with an initial data set. In this regard, a determination may be made as to whether the data point falls within a window size of initial data points. In cases that a data point is determined to correspond with an initial data set, data decomposition is performed in a modified online manner at block 2106. At block 2108, the components decomposed via the modified online manner are output. Such output components may be stored and/or provided to a data analysis service.

At block 2110, a determination is made as to whether the data point is the last data point of the initial data set. If not, the method ends at block 2112. If so, a data decomposition for each data point in the initial data set is performed in a batch manner at block 2114 (one example of performing batch processing is described in association with FIG. 22). In embodiments, the other data points and/or components associated with the initial data set (e.g., preceding and subsequent data) can be used to determine components for each particular data point in the initial data set. At block 2116, the data components are output, for example, stored for subsequent use (e.g., via a data store) and/or provided for data analysis.

Returning to block 2104, in cases it is determined that the data point does not correspond with the initial data set, at block 2118, a set of prior data points and/or corresponding components are accessed. The prior data points and/or corresponding components can be identified based on a window size for use in performing data decomposition. At block 2120, the prior data points and/or corresponding components are used to perform an online data decomposition in an iterative manner (one example of which is provided in FIG. 23) to identify trend, seasonal, and residual for the obtained data point. At block 2122, the data components are output, for example, stored for subsequent use and/or provided for data analysis.

With reference to FIG. 22, FIG. 22 illustrates a third method 2200 used for performing data decomposition, in accordance with embodiments of the present technology. In particular, method 2200 is directed to one example of performing a batch decomposition. As described herein, a batch data decomposition may be performed in relation to an initial data set of data points.

Initially, at block 2202, a data point is obtained. For example, an incoming data point may be obtained from a data source. At block 2204, a determination is made that the data point corresponds with an initial data set. In this regard, a determination is made that the data point falls within a window size of initial data points. At block 2206, the data point is stored in a data store, such as a cache. At block 2208, a determination is made that the data point is the last data point of the initial data set. Thereafter, at block 2210, a data decomposition for each data point in the initial data set is performed in a sequential manner. In this regard, the first data point is decomposed, followed by the second data point, and so on. In embodiments, decomposing each data point into components includes using the other data points and/or components associated with the initial data set (e.g., preceding and subsequent data). At block 2212, the data components are output, for example, stored for subsequent use (e.g., via a data store) and/or provided for data analysis. In embodiments, the data components, or a portion thereof, generated via batch processing, can be stored for subsequent use in performing online data decomposition.

Turning now to FIG. 23, FIG. 23 illustrates a fourth method 2300 used for performing data decomposition, in accordance with embodiments of the present technology. In particular, FIG. 23 provides an example of an iterative process for decomposing components. Initially, at block 2302, an initial trend is estimated for an incoming data point based on a particular set of previous data points. In embodiments, such particular set of previous data points correspond with a window size of four times a seasonality parameter. At block 2304, the initial trend is removed from the incoming data point to generate a detrended data point. At block 2306, an initial seasonal component is estimated for the incoming data point using the detrended data point and an initial seasonal components associated with the particular set of previous data points. At block 2308, an intermediate trend is estimated based on the initial seasonal component for the incoming data point and the initial seasonal components associated with a first portion of the particular set of previous data points. In some examples, the first portion of the particular set of previous data points correspond with a second window size of three times the seasonality parameter. At block 2310, the intermediate trend is removed from the detrended data point to generate an augmented detrended data point. In this way, the augmented detrended data point has both the initial and intermediate trend removed from the incoming data point. At block 2312, a final seasonal component for the incoming data point is estimated using the augmented detrended data point and a final seasonal component associated with the first portion of the particular set of previous data points. At block 2314, the final seasonal component is removed from the incoming data point to generate a deseasoned data point. A final trend is then estimated for the incoming data point, as indicated at block 2316, based on the deseasoned data point and a deseasoned data point associated with a second portion of the particular set of previous data points. In embodiments, the second portion of the particular set of previous data points correspond with a third window size of one times the seasonality parameter. At block 2318, a residual component is determined for the incoming data point by removing the final trend component and the final seasonal component from the incoming data point.

Figure 25:
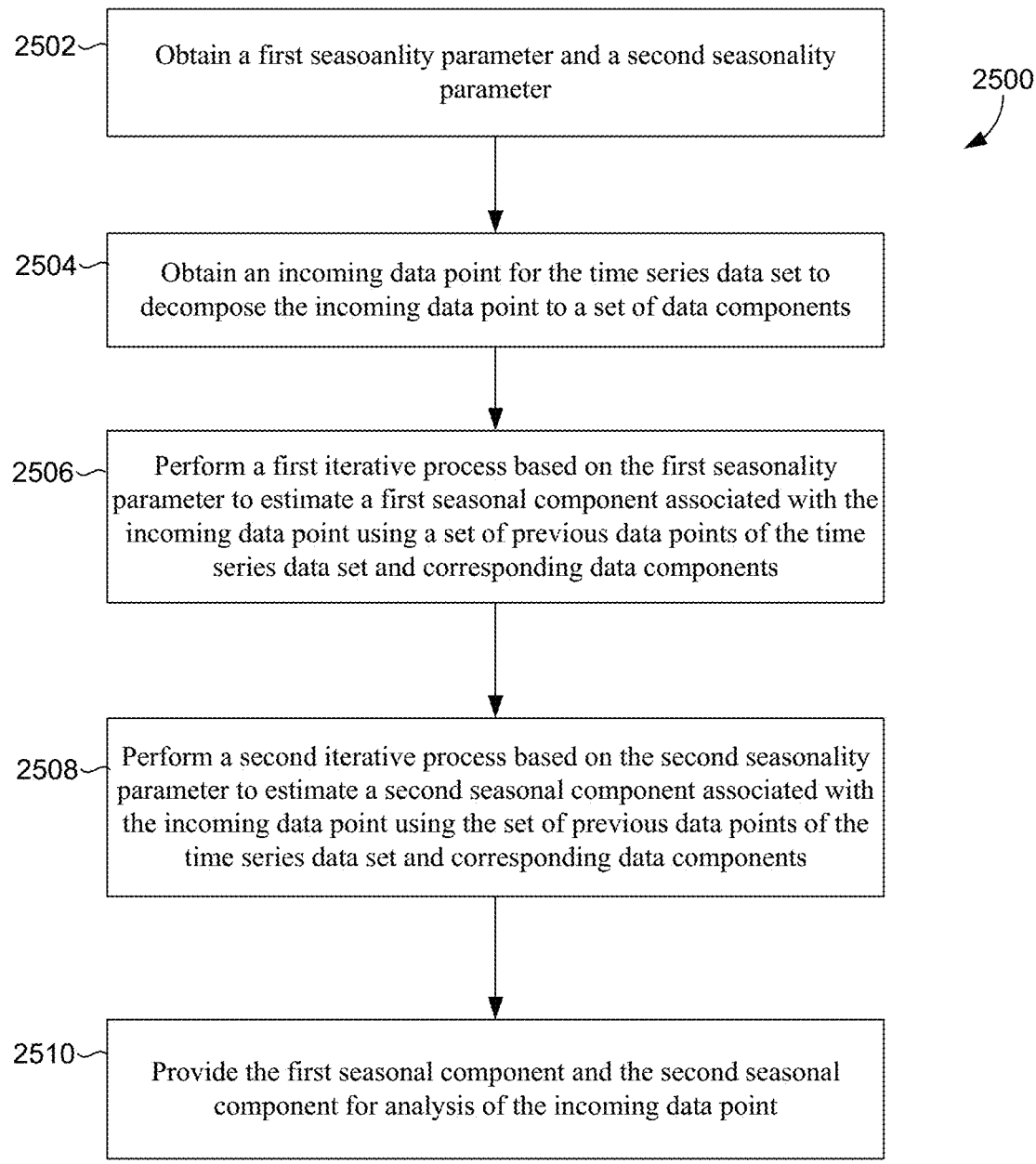
FIG. 25 illustrates a first method used for performing multiple seasonality data decomposition, in accordance with embodiments of the present disclosure.
Figure 26:
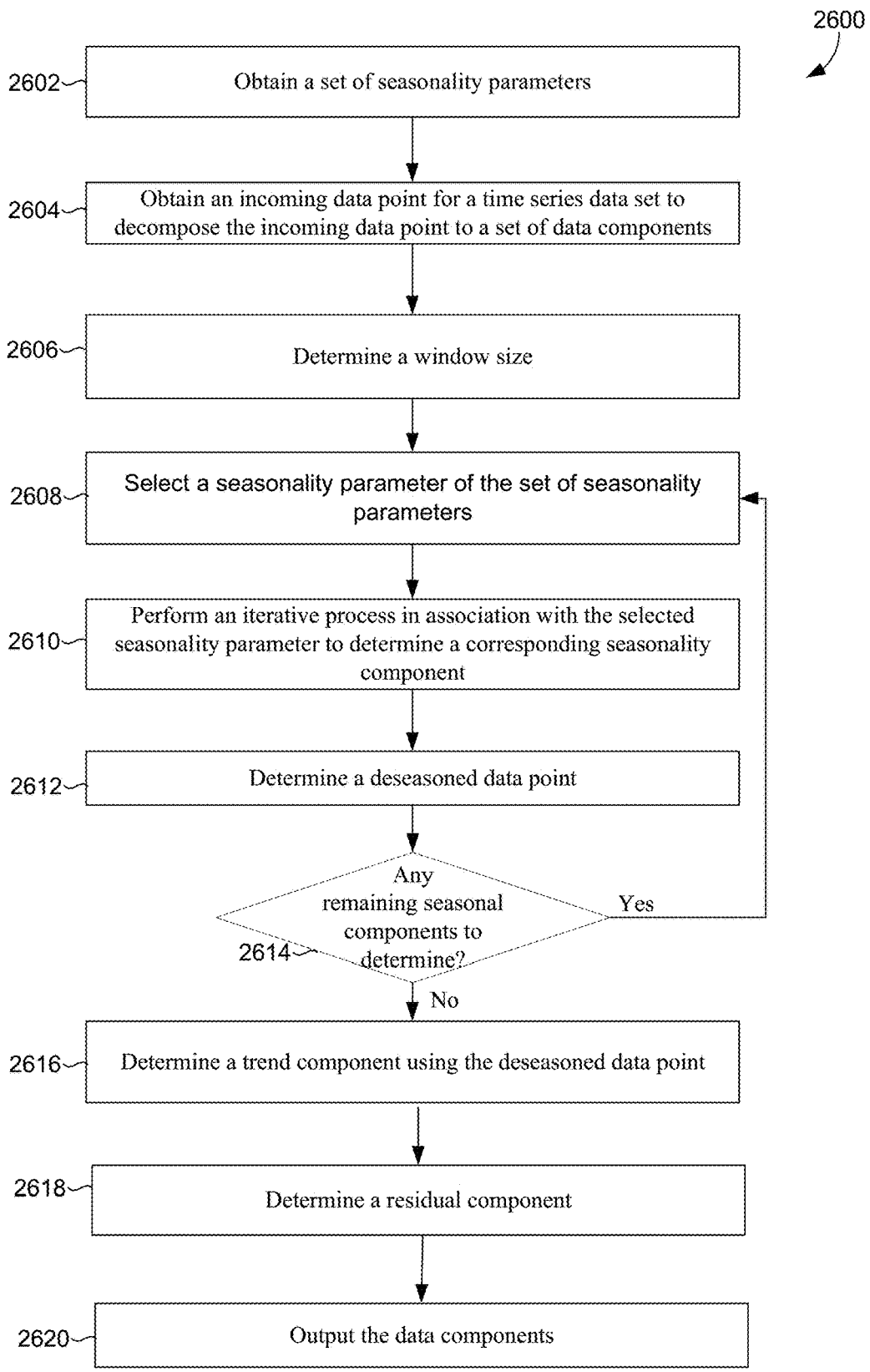
FIG. 26 illustrates a second method used for performing multiple seasonality data decomposition, in accordance with embodiments of the present disclosure.
Figure 27:
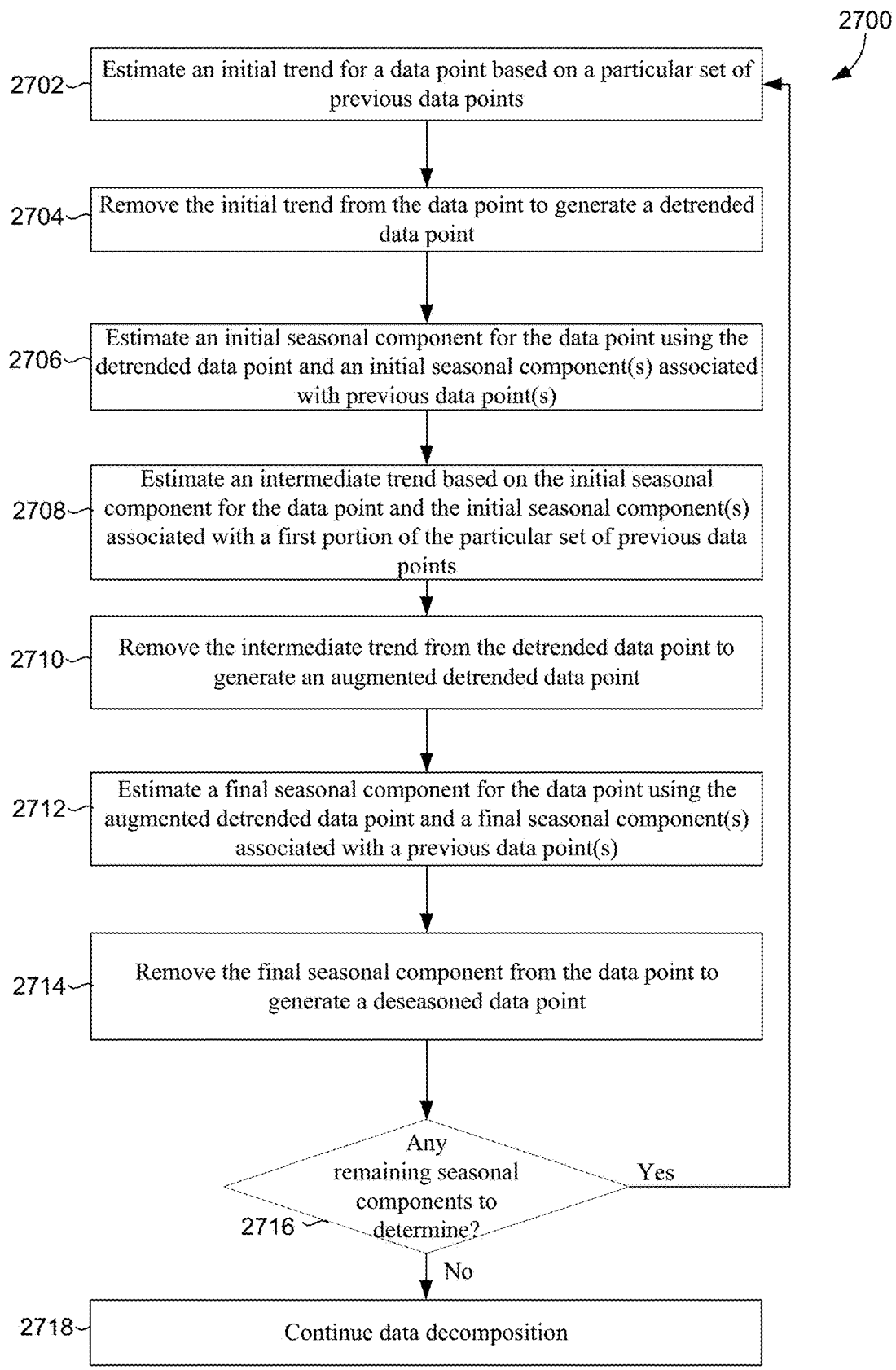
FIG. 27 illustrates a third method used for performing multiple seasonality data decomposition, in accordance with embodiments of the present disclosure.

3.4 Illustrative Operations for Determining Multiple Seasonalities Via Online Data Decomposition FIGS. 25-27 illustrate various methods of performing data decomposition, in accordance with embodiments of the present technology. Although the method 2500 of FIG. 25, the method 2600 of FIG. 26, and the method 2700 of FIG. 27 are provided as separate methods, the methods, or aspects thereof, can be combined into a single method or combination of methods. As can be appreciated, additional or alternative steps may also be included in different embodiments. Such methods may be performed, for example, at a data decomposition engine, such as data decomposition engine 1800 of FIG. 18.

With initial reference to FIG. 25, FIG. 25 illustrates a first method 2500 used for performing multiple seasonality data decomposition, in accordance with embodiments described herein. Initially, at block 2502, a first seasonality parameter and a second seasonality parameter are obtained. The first seasonality parameter and the second seasonality parameter indicate different seasonalities associated with a time series data set. In embodiments, the first and second seasonality parameters may be provided via a user. At block 2504, an incoming data point for the time series data set is obtained to decompose the incoming data point to a set of data components (e.g., a first seasonal component, a second seasonal component, a trend component, and/or a residual component). An incoming data point may be streamed in real time as the data point is observed.

At block 2506, a first iterative process is performed based on the first seasonality parameter to estimate a first seasonal component associated with the incoming data point using a set of previous data points of the time series data set and corresponding data components. The set of previous data points and corresponding data components may be based, at least in part, on a multiple of the first seasonality parameter (e.g., four times a seasonality parameter). At block 2508, a second iterative process is performed based on the second seasonality parameter to estimate a second seasonal component associated with the incoming data point using the set of previous data points of the time series data set and corresponding data components. At block 2510, the first seasonal component and the second seasonal component are provided for analysis of the incoming data point. For example, the first seasonal component and the second seasonal component may be provided for display such that a user may analyze the various seasonal data. As another example, the first seasonal component and the second seasonal component may be used to determined trend and/or residual associated with the incoming data point, which may thereafter be used for analysis (e.g., anomaly detection or trend analysis). In some cases, the data components for an incoming data point (e.g., first seasonal component and second seasonal component) are provided or output in real time such that a real time data analysis (e.g., anomaly detection) can be performed.

Turning now to FIG. 26, FIG. 26 illustrates a second method 2600 used for performing multiple seasonality data decomposition, in accordance with embodiments described herein. Initially, at block 2602, a set of seasonality parameters are obtained. The set of seasonality parameters indicate different seasonalities associated with a data set. In embodiments, the set of seasonality parameters may be provided via a user. For example, a user may recognize a weekly seasonality and a monthly seasonality associated with a dataset and provide a corresponding weekly seasonality parameter and monthly seasonality parameter. The parameter values may depend on the frequency at which the data is observed or collected. For example, in cases that data is collected on an hourly basis, a weekly seasonality parameter may be 168 (24 hours times 7 days).

At block 2604, an incoming data point for a time series data set is obtained to decompose the incoming data point to a set of data components (e.g., multiple seasonal components, a trend component, and/or a residual component). An incoming data point may be streamed in real time as the data point is observed.

At block 2606, a window size for use in performing data decomposition is determined. A window size may be defined in any number of ways. As one example, a window size may be a multiple of a seasonality parameter. For example, a largest seasonality parameter of the set of obtained seasonality parameters may be identified and used to determine the window size.

At block 2608, a seasonality parameter of the set of seasonality parameters is selected or referenced. In some cases, the seasonality parameter may be selected or referenced in a particular order, such as smallest to largest. For example, in a first iterative process, the smallest seasonality parameter may be selected, in a second iterative process, the next smallest seasonality parameter may be selected, and so on.

At block 2610, an iterative process is performed in association with the corresponding seasonality parameter to determine a corresponding seasonal component. For example, assume a user inputs seasonality parameters of 24 and 168, the 24 daily seasonality parameter may be selected, and an interactive process can be performed in association with the 24 seasonality parameter to determine a corresponding seasonal component for the incoming data point. At least one example of an iterative process performed to determine a seasonal component is described herein.

At block 2612, a deseasoned data point is determined. A deseasoned data point generally refers to the incoming data point with the determined seasonal component(s) removed. In some cases, each of the seasonal components determined for the data point is removed from the incoming data point to identify the deseasoned data point.

At block 2614, a determination is made as to whether an iterative process to determine a seasonal component has not been performed for any of the seasonality parameters of the set of seasonality parameters. If so, the process returns to block 2508 at which a seasonality parameter is selected or referenced for use in determining a corresponding seasonal component.

If not, the process continues to block 2616 at which a trend component is determined using the deseasoned data point. At block 2618, a residual component is determined. In embodiments, the residual component is determined for the incoming data point by removing the seasonal component(s) and trend component from the incoming data point. Stated differently, trend may be removed from the deseasoned data point having each of the multiple seasonal components removed to determine the residual component. At block 2620, the data components are output, for example, stored for subsequent use (e.g., via a data store) and/or provided for data analysis.

With reference to FIG. 27, FIG. 27 illustrates a third method 2700 used for performing multiple seasonality data decomposition, in accordance with embodiments described herein. In particular, FIG. 27 provides an example of an iterative process that can be performed to determine each seasonal component. In this way, in accordance with a particular seasonality parameter for which a corresponding seasonal component is being determined for a data point (e.g., incoming data point), method 2700 may be employed. Method 2700 may be executed for each seasonality parameter to determine corresponding seasonal components.

Initially, at block 2702, an initial trend is estimated for a data point based on a particular set of previous data points. In embodiments, such a particular set of previous data points corresponds with a window size of four times a seasonality parameter. In some cases, the seasonality parameter used to determine a window size is selected from a set of seasonality parameters for which corresponding seasonal components are to be determined. For example, assume a user provides a first seasonality parameter, a second seasonality parameter, and a third seasonality parameter for which to determine seasonal components of data points. In such a case, a particular seasonality parameter, such as a largest or greatest numerical value of a seasonality parameter, may be selected and used to determine a window size. In some cases, the particular seasonality parameter may be used for each iteration executed. For example, the largest seasonality parameter may be used to determine window size for each iteration of determining seasonal components. In other cases, the seasonality parameter for which a seasonal component is being determined may be used to determine window size for the corresponding iteration. At block 2704, the initial trend is removed from the data point to generate a detrended data point.

At block 2706, an initial seasonal component is estimated for the data point using the detrended data point and an initial seasonal component associated with previous data points. For instance, the initial seasonal components associated with previous data points may be represented as a running average in an index such that the index can be efficiently referenced and used to determine the initial seasonal component. As can be appreciated, such a running average can be efficiently indexed and updated to efficiently access previous seasonal components and determine a current seasonal component.

By way of example only, assume a seasonality parameter is 10 and an incoming data point corresponds with a period or timestamp of 115. In such a case, the data point of 115 corresponds to a fifth element in a period of 10. An index associated with the fifth element (or a portion of an index associated with a fifth element) can be accessed to identify a running average of seasonal components of previous analyzed data points associated with the fifth element, such as seasonal components associated with data points corresponding with points 5, 15, 25, 35, 45, etc. The indexed seasonal component estimate may be used to determine a seasonal component for the incoming data point. Upon determining a seasonal component associated with the incoming data point, the index can be updated to include the new seasonal component (e.g., either in addition to previous seasonal components or to replace/update a seasonal component estimate representation).

At block 2708, an intermediate trend is estimated based on the initial seasonal component for the data point and the initial seasonal component associated with a first portion of the particular set of previous data points. In some examples, the first portion of the particular set of previous data points correspond with a second window size of three times the seasonality parameter (e.g., a largest seasonality parameter).

At block 2710, the intermediate trend is removed from the detrended data point to generate an augmented detrended data point. In this way, the augmented detrended data point has both the initial and intermediate trend removed from the data point. At block 2712, a final seasonal component for the incoming data point is estimated using the augmented detrended data point and a final seasonal component associated with previous data points (e.g., the first portion of the particular set of previous data points or all corresponding previous data points that align with the seasonality). At block 2714, the final seasonal component is removed from the data point to generate a deseasoned data point.

At block 2716, a determination is made as to whether there are any remaining seasonal components to determine. In this regard, it can be determined whether any input or obtained seasonality parameters have not been analyzed to determine corresponding seasonal components. If it is determined that a seasonal component remains to be determined for a corresponding seasonality parameter, the method returns to block 2702, at which the deseasoned data point is used to estimate an initial trend. Such an initial trend can be determined based on a particular set (e.g., window size of four times a maximum seasonality of seasonality parameters) of previous data points and/or corresponding components (e.g., the deseasoned data points corresponding with a particular set of seasonal components removed, such as the first seasonal component removed upon completing a first iterative process to determine the first seasonal component).

If it is determined that each seasonal component corresponding with a set of seasonality parameters have been determined, the method proceeds to block 2718 to continue performing data decomposition. For example, in some implementations, a final trend can be estimated for the data point based on the deseasoned data point (with all seasonal components removed) and deseasoned data points (with all seasonal components removed) associated with a second portion of the particular set of previous data points. In embodiments, the second portion of the particular set of previous data points correspond with a third window size of one times the seasonality parameter. Thereafter, a residual component may be determined for the data point by removing the final trend and the final seasonal component(s) from the data point.

3.5 Illustrative Hardware System

The systems and methods described above may be implemented in a number of ways. One such implementation includes computer devices having various electronic components. For example, components of the system in FIG. 18 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors in programmed computers. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 28:
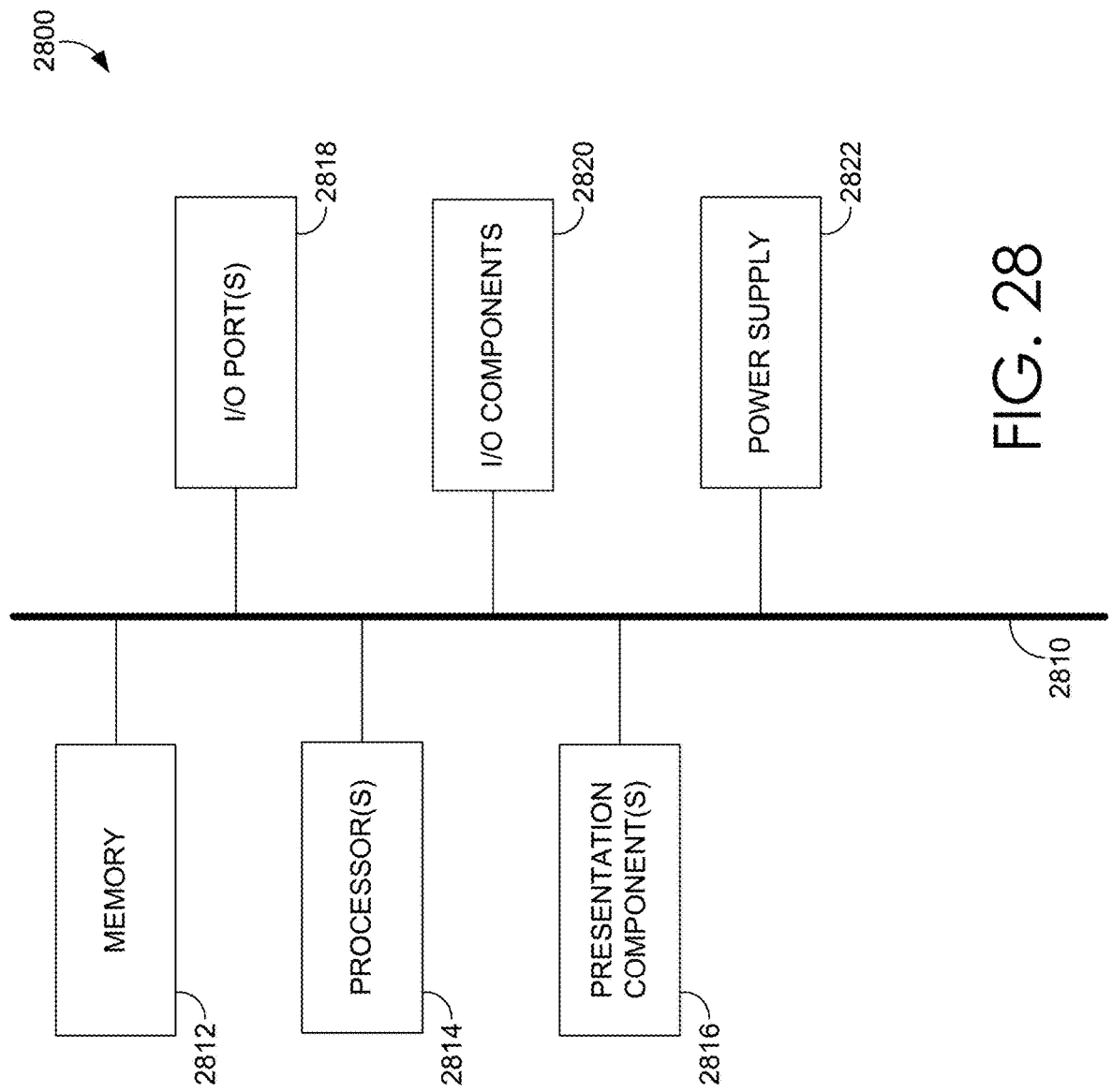
FIG. 28 is a block diagram of an example computing device in which embodiments of the present disclosure may be employed.

An example operating environment in which embodiments of the present technology may be implemented is described below in order to provide a general context for various aspects of the present technology. Referring to FIG. 28, an illustrative operating environment for implementing embodiments of the present technology is shown and designated generally as computing device 2800. Computing device 2800 is but one example of a suitable operating environment and is not intended to suggest any limitation as to the scope of use or functionality of the technology. Neither should the computing device 2800 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including handheld devices, consumer electronics, general-purpose computers, more specialized computing devices, etc. The technology may also be practiced in distributed computing environments where tasks are performed by remote-processing devices that are linked through a communications network.

With reference to FIG. 28, computing device 2800 includes a bus 2810 that directly or indirectly couples the following devices: memory 2812, one or more processors 2814, one or more presentation components 2816, input/output (I/O) ports 2818, I/O components 2820, and an illustrative power supply 2822. Bus 2810 represents what may be one or more busses (such as, for example, an address bus, data bus, or combination thereof). Although depicted in FIG. 28, for the sake of clarity, as delineated boxes that depict groups of devices without overlap between these groups of devices, in reality, this delineation is not so clear cut and a device may well fall within multiple ones of these depicted boxes. For example, one may consider a display to be one of the one or more presentation components 2816 while also being one of the I/O components 2820. As another example, processors have memory integrated therewith in the form of cache; however, there is no overlap depicted between the one or more processors 2814 and the memory 2812. A person of skill in the art will readily recognize that such is the nature of the art, and it is reiterated that the diagram of FIG. 28 merely depicts an illustrative computing device that can be used in connection with one or more embodiments of the present technology. It should also be noticed that distinction is not made between such categories as "workstation," "server," "laptop," "handheld device," etc., as all such devices are contemplated to be within the scope of computing device 2800 of FIG. 28 and any other reference to "computing device," unless the context clearly indicates otherwise.

Computing device 2800 typically includes a variety of computer-readable media. Computer-readable media can be any available media that can be accessed by computing device 2800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2800. Computer storage media does not comprise signals per se, such as, for example, a carrier wave. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 2812 includes computer storage media in the form of volatile and/or nonvolatile memory. The memory may be removable, non-removable, or a combination thereof. Typical hardware devices may include, for example, solid-state memory, hard drives, optical-disc drives, etc. Computing device 2800 includes one or more processors 2814 that read data from various entities such as memory 2812 or I/O components 2820. Presentation component(s) 2816 present data indications to a user or other device. Illustrative presentation components include a display device, speaker, printing component, vibrating component, etc.

I/O ports 2818 allow computing device 2800 to be logically coupled to other devices including I/O components 2820, some of which may be built in. Illustrative components include a keyboard, mouse, microphone, joystick, game pad, satellite dish, scanner, printer, wireless device, etc. The I/O components 2820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 2800. The computing device 2800 may be equipped with depth cameras, such as stereoscopic camera systems, infrared camera systems, RGB camera systems, touchscreen technology, and combinations of these, for gesture detection and recognition. Additionally, the computing device 2800 may be equipped with accelerometers or gyroscopes that enable detection of motion.

As can be understood, implementations of the present disclosure provide for various approaches to data processing. The present technology has been described in relation to particular embodiments, which are intended in all respects to be illustrative rather than restrictive. Alternative embodiments will become apparent to those of ordinary skill in the art to which the present technology pertains without departing from its scope.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
    obtaining a first seasonality parameter and a second seasonality parameter based on a user selection via a user interface, the first seasonality parameter and the second seasonality parameter indicating different seasonalities associated with a time series data set;
    obtaining, in real-time, an incoming data point, for the time series data set, to decompose to a set of data components;
    based on the first seasonality parameter, performing, via a data decomposition engine, a first iterative process to estimate a first seasonal component associated with the incoming data point based on a set of previous data points of the time series data set and corresponding data components;
    based on the second seasonality parameter, performing, via the data decomposition engine, a second iterative process to estimate a second seasonal component associated with the incoming data point based on the set of previous data points of the time series data set and corresponding data components; and
    providing the first seasonal component and the second seasonal component for analysis of the incoming data point.

2. The computer-implemented method of claim 1, wherein the second iterative process to estimate the second seasonal component associated with the incoming data point is performed based on a deseasoned data point comprising the first seasonal component removed from the incoming data point.

3. The computer-implemented method of claim 1, wherein the first iterative process and the second iterative process of estimating the first seasonal component and the second seasonal component to decompose the incoming data point is performed in real time upon obtaining the incoming data point such that a subsequent data point of the time series data set is not used to decompose the incoming data point.

4. The computer-implemented method of claim 1, wherein each of the first iterative process and the second iterative process of estimating the first seasonal component and the second seasonal component to decompose the incoming data point to the set of data components comprises estimating multiple trend components and multiple seasonal components in an iterative manner.

5. The computer-implemented method of claim 1, wherein the first iterative process of estimating the first seasonal component to decompose the incoming data point to the set of data components comprises:
    estimating an initial trend for the incoming data point based on the set of previous data points;
    removing the initial trend from the incoming data point to generate a detrended data point;
    estimating an initial seasonal component for the incoming data point based on the first seasonality parameter using the detrended data point and initial seasonal components associated with the set of previous data points;
    estimating an intermediate trend based on the initial seasonal component for the incoming data point and the initial seasonal components associated with the set of previous data points;
    removing the initial trend and the intermediate trend from the incoming data point to generate a second detrended data point;
    estimating a final seasonal component associated with the first seasonality parameter for the incoming data point using the second detrended data point.

6. The computer-implemented method of claim 1, wherein the first iterative process of estimating the first seasonal component to decompose the incoming data point to the set of data components comprises:
    estimating an initial trend for the incoming data point based on the set of previous data points, wherein the set of previous data points correspond with a window size of four times the first seasonality parameter;
    removing the initial trend from the incoming data point to generate a detrended data point;
    estimating an initial seasonal component for the incoming data point based on the first seasonality parameter using the detrended data point and initial seasonal components associated with the set of previous data points;
    estimating an intermediate trend based on the initial seasonal component for the incoming data point and the initial seasonal components associated with a first portion of the set of previous data points, wherein the first portion of the set of previous data points correspond with a second window size of three times the first seasonality parameter;
    removing the intermediate trend from the detrended data point to generate a second detrended data point; and
    estimating a final seasonal component associated with the first seasonality parameter for the incoming data point using the second detrended data point and final seasonal components associated with the first portion of the set of previous data points.

7. The computer-implemented method of claim 1, wherein upon performing the first iterative process to estimate the first seasonal component, the method further comprises:
    removing the first seasonal component associated with the first seasonality parameter from the incoming data point to generate a deseasoned data point; and
    providing the deseasoned data point as input to the second iterative process to estimate the second seasonal component associated with the second seasonality parameter.

8. The computer-implemented method of claim 1, wherein upon performing the first iterative process to estimate the first seasonal component and the second iterative process to estimate the second seasonal component, the method further comprises:
removing the first seasonal component and the second seasonal component from the incoming data point to generate a deseasoned data point;
determining a final trend for the incoming data point based on the deseasoned data point; and
determining a residual for the incoming data point by removing the first seasonal component, the second seasonal component, and the final trend from the incoming data point.

9. The computer-implemented method of claim 1, wherein the residual component is used to identify an anomaly in the time series data set.

10. The computer-implemented method of claim 1, wherein the set of previous data points of the time series data set and the corresponding data components are stored in a data buffer that captures data associated with the set of previous data points.

11. The computer-implemented method of claim 1, wherein the set of previous data points comprises data points within a window size defined as a multiple of a largest of the first seasonality parameter or the second seasonality parameter provided via user input.

12. The computer-implemented method of claim 1, wherein the first seasonal component and the second seasonal component are provided for presentation to a user via a graphical user interface.

13. The computer-implemented method of claim 1, wherein the first seasonal component and the second seasonal component are used to determine a final trend for the incoming data point.

14. The computer-implemented method of claim 1 further comprising:
determining that the incoming data point is outside of an initial window size of data points for which batch processing is performed for data decomposition.

15. The computer-implemented method of claim 1, wherein the corresponding data components used to decompose the incoming data point comprise data components determined via a batch decomposition process.

16. The computer-implemented method of claim 1, wherein the corresponding data components used to decompose the incoming data point comprise data components determined via a batch decomposition process that performs the first iterative process and the second iterative process of estimating seasonal components.

17. The computer-implemented method of claim 1, wherein the first iterative process of estimating the first seasonal component comprises determining an initial trend and an intermediate trend as well as an initial seasonal component and a final seasonal component.

18. The computer-implemented method of claim 1, wherein the set of previous data points are stored in a cache for access to perform the iterative process of estimating the first seasonal component and the second seasonal component.

19. One or more non-transitory computer-readable storage media having instructions stored thereon, wherein the instructions, when executed by a computing device, cause the computing device to:
obtain a first seasonality parameter and a second seasonality parameter based on a user selection via a user interface, the first seasonality parameter and the second seasonality parameter indicating different seasonalities associated with a time series data set;
obtain, in real-time, an incoming data point, for the time series data set, to decompose to a set of data components;
based on the first seasonality parameter, perform, via a data decomposition engine, a first iterative process to estimate a first seasonal component associated with the incoming data point based on a set of previous data points of the time series data set and corresponding data components;
based on the second seasonality parameter, perform, via the data decomposition engine, a second iterative process to estimate a second seasonal component associated with the incoming data point based on the set of previous data points of the time series data set and corresponding data components; and
provide the first seasonal component and the second seasonal component for analysis of the incoming data point.

20. A computing device comprising:
one or more processors; and
a memory coupled with the one or more processors, the memory having instructions stored thereon, wherein the instructions, when executed by the one or more processors, cause the computing device to:
obtain a first seasonality parameter and a second seasonality parameter based on a user selection via a user interface, the first seasonality parameter and the second seasonality parameter indicating different seasonalities associated with a time series data set;
obtain, in real-time, an incoming data point, for the time series data set, to decompose to a set of data components;
based on the first seasonality parameter, perform, via a data decomposition engine, a first iterative process to estimate a first seasonal component associated with the incoming data point based on a set of previous data points of the time series data set and corresponding data components;
based on the second seasonality parameter, perform, via the data decomposition engine, a second iterative process to estimate a second seasonal component associated with the incoming data point based on the set of previous data points of the time series data set and corresponding data components; and
provide the first seasonal component and the second seasonal component for analysis of the incoming data point.

* * * * *